(12) United States Patent
California et al.

(10) Patent No.: US 11,867,351 B2
(45) Date of Patent: Jan. 9, 2024

(54) CONFIGURABLE STAND AND TIE BASE FOR LIGHTWEIGHT OBJECT

(71) Applicants: Zachary California, Erin, NY (US); Laura California, Erin, NY (US); Randall John California, Warren, PA (US)

(72) Inventors: Zachary California, Erin, NY (US); Laura California, Erin, NY (US); Randall John California, Warren, PA (US)

( * ) Notice: Subject to any disclaimer, the term of this patent is extended or adjusted under 35 U.S.C. 154(b) by 0 days.

(21) Appl. No.: 18/144,147

(22) Filed: May 5, 2023

(65) Prior Publication Data
US 2023/0358358 A1 Nov. 9, 2023

Related U.S. Application Data

(60) Provisional application No. 63/339,437, filed on May 7, 2022.

(51) Int. Cl.
*F16M 11/40* (2006.01)
*F16M 11/04* (2006.01)

(52) U.S. Cl.
CPC ............ *F16M 11/40* (2013.01); *F16M 11/04* (2013.01)

(58) Field of Classification Search
CPC ......... F16M 11/40; F16M 11/04; H04M 1/04; A45C 2011/002; A45C 2200/15; H04B 1/3888
USPC ....................................................... 248/160
See application file for complete search history.

(56) References Cited

U.S. PATENT DOCUMENTS

| | | | |
|---|---|---|---|
| 9,438,295 B1* | 9/2016 | Song ...................... H04M 1/04 |
| 2010/0115732 A1* | 5/2010 | Honeycutt ........... H04R 5/0335 |
| | | | 24/3.12 |
| 2010/0294908 A1* | 11/2010 | Mish .................... F16M 11/041 |
| | | | 248/454 |
| 2011/0215217 A1* | 9/2011 | De La Garza .......... H04M 1/04 |
| | | | 248/176.1 |
| 2013/0026316 A1* | 1/2013 | Case ................. B29C 45/14565 |
| | | | 248/302 |
| 2013/0032617 A1* | 2/2013 | Adelman ................ A45C 11/00 |
| | | | 224/191 |
| 2014/0346306 A1* | 11/2014 | Mayfield ................ F16M 13/00 |
| | | | 248/455 |
| 2015/0180527 A1* | 6/2015 | Fathollahi ............ H04B 1/3888 |
| | | | 455/575.8 |
| 2016/0172883 A1* | 6/2016 | Globerson ........... H04B 1/3888 |
| | | | 320/115 |
| 2018/0271241 A1* | 9/2018 | Rindlisbacher ...... A45C 13/002 |
| 2020/0326035 A1* | 10/2020 | McKinney ............. F16M 13/00 |
| 2021/0059371 A1* | 3/2021 | Balmer .................. F16M 13/04 |
| 2023/0147889 A1* | 5/2023 | Lane ...................... H02J 7/0044 |
| | | | 320/108 |

* cited by examiner

*Primary Examiner* — Christopher Garft
(74) *Attorney, Agent, or Firm* — Jong Patent Firm; Cheng Ning Jong; Tracy P. Jong

(57) ABSTRACT

A configurable stand and tie base of an object, the configurable stand and tie base including a base member including a front portion and a rear portion; and a channel disposed on the front portion of the base member, the channel is configured to receive a flexible tie, wherein the flexible tie is disposable substantially in its entirety in the channel when not in use or partially in the channel while in use.

10 Claims, 25 Drawing Sheets

SECTION B-B
SCALE 2 : 1

CONFIGURABLE STAND AND TIE BASE FOR LIGHTWEIGHT OBJECT

PRIORITY CLAIM AND RELATED APPLICATIONS

This non-provisional application claims the benefit of priority from provisional application U.S. Ser. No. 63/339,437 filed on May 7, 2022. Said application is incorporated by reference in its entirety.

BACKGROUND OF THE INVENTION

1. The Field of the Invention

The present invention relates to a support of a lightweight object. More specifically, the present invention is directed to a configurable stand and tie system for a lightweight object.

2. Background Art

Various attachment systems, frames, support structures, removable or otherwise, have been attempted and provided in the past, to facilitate the securement of devices, e.g., cameras, phones, sensors, etc., especially under unplanned conditions, e.g., in the wild and when the needs for securing the device at a location and in a certain orientation arise at moment's notice. These attachment systems are typically large, bulky and impractical to be transported or brought along or attached to the objects they are configured to support. For instance, a phone case configured for supporting a phone as a stand is typically collapsible and compact but its use is limited as a stand capable only in disposing the phone at a single incline/setting or at most two inclines/settings. Further, some securing devices come in the form of clamps of various sizes and clamping means, all of which take up a significant amount of space and yet do not offer a sufficient degree of freedom to enable the objects they secure or support to be orientated in almost any manner. However, with a limited number of sizes and shapes of the support structures they are configured to interface with, the use of clamp-type devices can be limited. Support or attachment devices which take up a significant amount of space are often inadvertently left behind as they are inconvenient to be brought together with the objects they are configured to support. Therefore, owners of such devices tend to leave their devices unused as they are unavailable when situations call for their use.

There exists a need for a system that not only serves as a stand but also as a tie configurable to suit many unplanned circumstances which can potentially be encountered in the field, especially outdoors, etc.

SUMMARY OF THE INVENTION

In accordance with the present invention, there is provided a configurable stand and tie base of an object, the configurable stand and tie base including:
  a base member including a front portion and a rear portion; and
  at least one channel disposed on the front portion of the base member, the channel is configured to receive a flexible tie,
  wherein the flexible tie is disposable at least partially in the at least one channel when the configurable stand and tie base is not in use to increase the compactness of the configurable stand and tie base and a larger portion of the flexible tie is removable from the at least one channel when the configurable stand and tie is in use.

In one embodiment, the base member includes a first portion upon which the at least one channel is disposed and a second portion including a retainer configured for retaining the flexible tie and configured to be removably coupled to the first portion. In one embodiment, the first portion and the second portion are configured to be removably coupled with a male-female buckle pair. In one embodiment, the retainer includes a complementary pair of jaws configured to accommodate the flexible tie while being coupled together to secure the flexible tie to the retainer. In one embodiment, the configurable stand and tie base further includes an adhesive disposed on the rear portion of the base member, the adhesive is configured for attachment to a surface of the object. In one embodiment, the channel includes a cross-sectional profile having a body and a neck that is narrower than the body such that when the flexible tie is inserted within the body through the neck, the flexible tie is retainable within the body. In one embodiment, the at least one channel includes two walls leaning towards one another to form a cross-sectional profile having a body and a neck that is narrower than the body such that when the flexible tie is inserted within the body through the neck, the flexible tie is retainable within the body. In one embodiment, at least one of the two walls further includes a chamfer disposed on the at least one of the two walls for facilitating seating of the flexible tie in the body through the neck. In one embodiment, the at least one channel includes at least two substantially parallel portions connected by a turn, wherein the two substantially parallel portions are disposed at a minimum distance of about 0.5 inch. In one embodiment, the at least one channel includes at least two substantially parallel portions connected by a turn, wherein a ratio of a radius of the turn to a thickness of the flexible tie is about 2 to about 1. In one embodiment, the at least one channel includes at least two substantially parallel portions connected by a turn, wherein a ratio of a radius of the turn to a width of the neck is about 1.5 to about 1. In one embodiment, a width of the neck of the at least one channel is about 0.25 inch. In one embodiment, the base member further comprises a slider configured to be slideable along a track and disposable in more than one position, each of the more than one position corresponding to a degree by which the flexible tie is disposable outside of the at least one channel, thereby providing a range of adjustments allowable when the slider is disposed in one of the more than one position.

In accordance with the present invention, there is further provided a configurable stand and tie base of an object, the configurable stand and tie base including a base member including:
  (a) a first portion; and
  (b) a second portion including at least one flexible tie,
  wherein the first portion is configured to be removably attached to the second portion.

In one embodiment, the first portion is configured to be removably attached to the second portion with a male-female buckle pair. In one embodiment, the configurable stand and tie base further includes an adhesive disposed on a portion of the base member, wherein the adhesive is configured for attachment to a surface of the object. In one embodiment, the first portion includes at least one channel disposed on a surface of the first portion and the at least one channel is configured to receive the at least one flexible tie. In one embodiment, the front portion further includes at least one channel including a cross-sectional profile having a body and a neck that is narrower than the body such that when the at least one flexible tie is inserted within the body through the neck, the at least one flexible tie is retainable within the body.

An object of the present invention is to provide a configurable support for a lightweight object.

Another object of the present invention is to provide a support for an object that is available for use with support bases of various shapes and sizes.

Another object of the present invention is to provide a support for an object that is readily available as it can be attached to the object and be made integral with the object.

Another object of the present invention is to provide a support for an object that is interchangeable to allow the use of a suitable support for a variety of applications. Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—configurable stand and tie base
4—base member
6—front portion of base member
8—rear portion of base member
10—channel
12—radius
14—flexible tie
16—boning
18—cover
20—chamfer
22—wall
24—angle
26—angle
28—height of channel
30—base of channel
32—notch
34—portion of flexible tie lodged in notch
36—object, e.g., mobile phone
38—one end of flexible tie
40—one end of flexible tie
42—one end of channel
44—one end of channel
46—support
48—central axis of channel
50—body
52—neck
54—direction
56—line
58—support surface
60—outer diameter of flexible tie
62—surface feature
64—width of neck opening of channel
66—distance between two consecutive channel portions
68—width of neck or neck opening of channel
70—width of neck or neck opening of channel
72—bridge
74—first portion of base member
76—second portion of base member
78—end cap
80—male buckle
82—female buckle
84—tongue
86—groove
88—adhesive
90—reduced-size portion of flexible tie
92—slider
94—groove

PARTICULAR ADVANTAGES OF THE INVENTION

The present stand and tie system provides a flexible means for an object to be supplied a stand such that the object, e.g., a mobile device can be orientated in manners suitable for use by a user.

The present stand and tie system is versatile in that the various uses of the present stand and tie can be altered simply by changing the flexible tie used with a base of the present stand and tie and also manipulating the flexible tie in a manner suitable for securing an object to a support in a desired position and orientation.

In one embodiment, the present stand and tie system is provided in more than one part, allowing a first of the parts to be fixedly secured to the object it supports and a second of the parts to be removably coupled to the first part. For applications requiring a different support structure, the second part can simply be removed and replaced with another second part that possesses the desired features.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
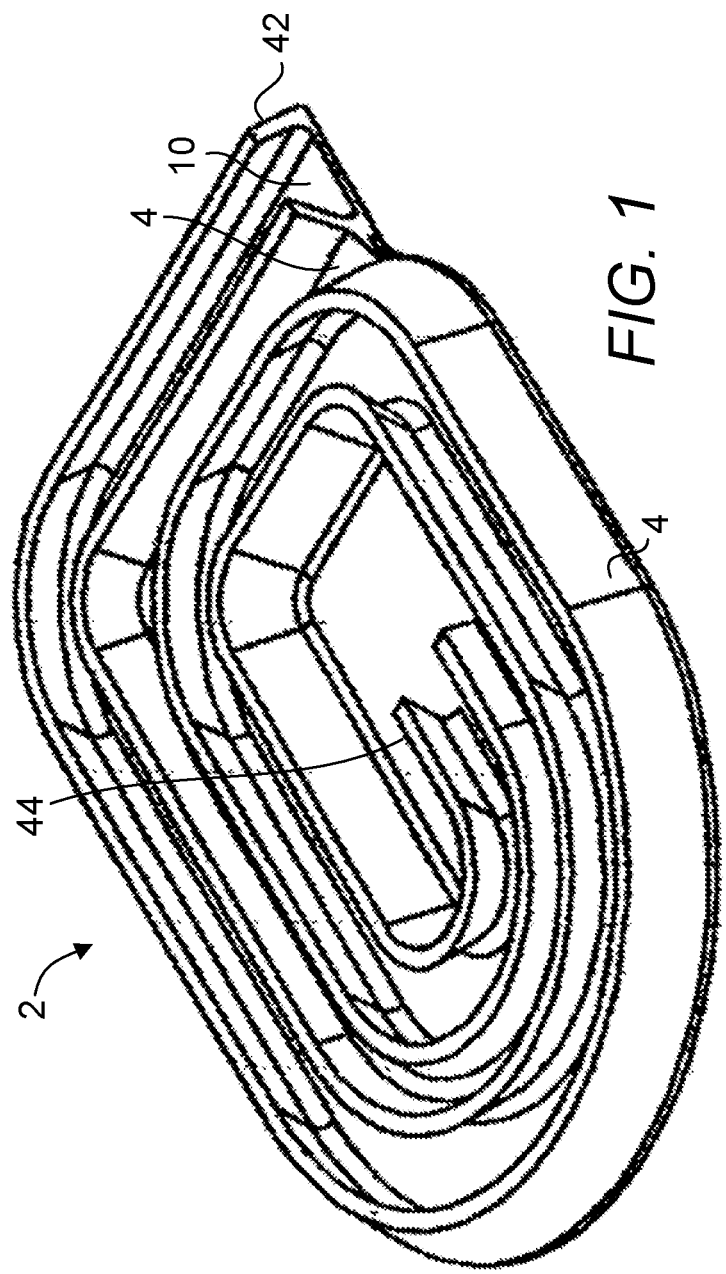
FIG. 1 is a front perspective view of a base member of one embodiment according to a present configurable stand and tie base.
Figure 2:
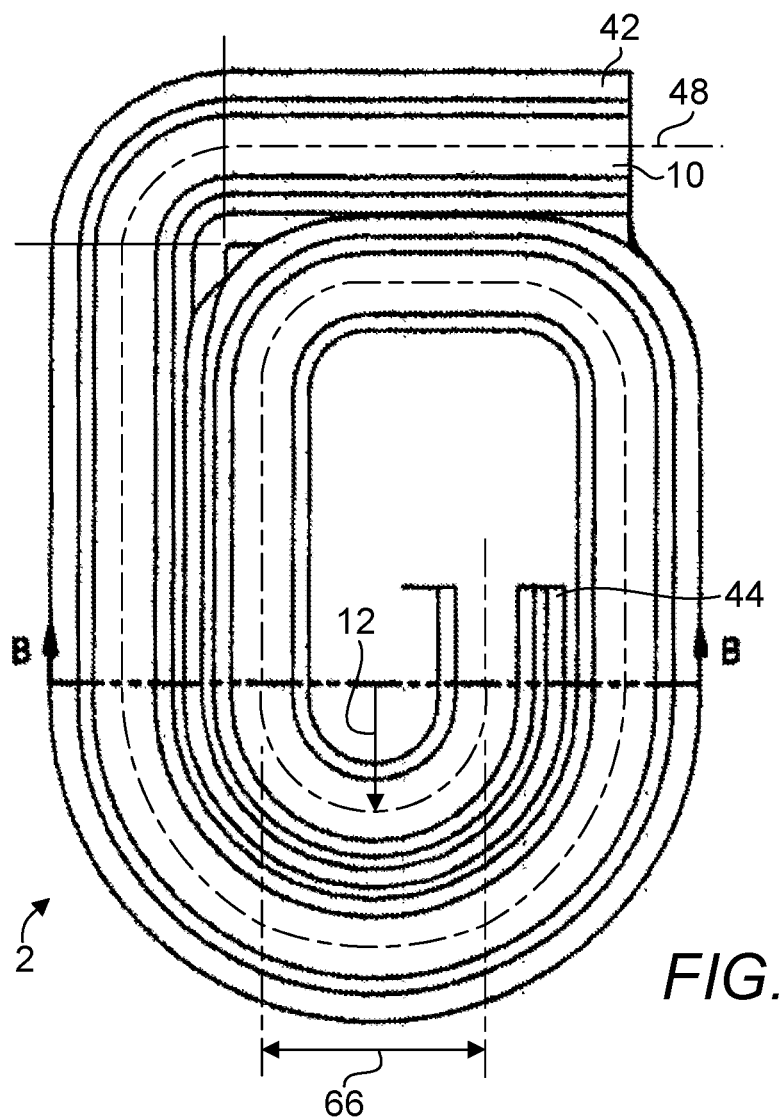
FIG. 2 is a front view of a base member of one embodiment according to a present configurable stand and tie base.
Figure 3:
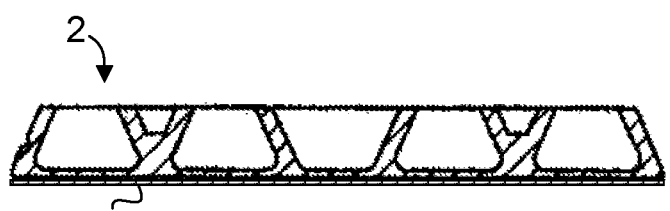
FIG. 3 is a cross-sectional view of a base member of one embodiment according to a present configurable stand and tie base as taken along line B-B of FIG. 2.
Figure 4:
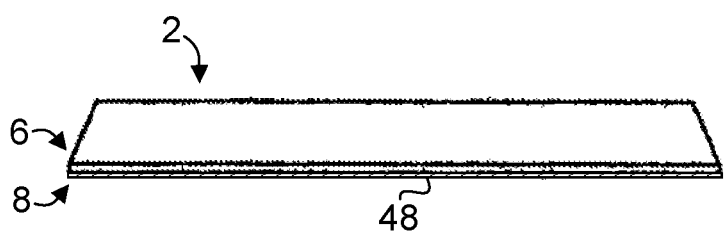
FIG. 4 is an elevation view of a base member of one embodiment according to a present configurable stand and tie base.

FIG. 1 is a front perspective view of a base member of one embodiment according to a present configurable stand and tie base 2. FIG. 2 is a front view of a base member of one embodiment according to a present configurable stand and tie base 2. FIG. 3 is a cross-sectional view of a base member 4 of one embodiment according to a present configurable stand and tie base 2 as taken along line B-B of FIG. 2. FIG. 4 is an elevation view of a base member of one embodiment according to a present configurable stand and tie base 2. Disclosed herein is a configurable stand and tie base 2 of an object, especially a lightweight object, e.g., an object weighing under about 2 lbs. The configurable stand and tie base 2 includes a base member 4 and a channel 10. The base member 4 includes a front portion 6 and a rear portion 8. The channel 10 is disposed on the front portion 6 of the base member 4 and configured to receive and retain a flexible tie 14. In one embodiment, a channel 10 is preferably constructed from a polymeric material or a material capable of deformation under a force exerted on it by the finger/s of a user. In one embodiment, configurable stand and tie base 2 further includes an adhesive disposed on the rear portion of the base member 4. The adhesive is configured for attachment to a surface of an object the present stand and tie base 2 is configured to support. In one embodiment, the channel includes at least two substantially parallel portions connected by a turn, wherein the two substantially parallel portions are disposed at a minimum distance 66 of about 0.5 inch. This distance is important in that a turn which connects two consecutive portions of the channel 10 cannot be so small that the radius 12 formed by the turn is not negotiable by a flexible tie 14.

Figure 5:
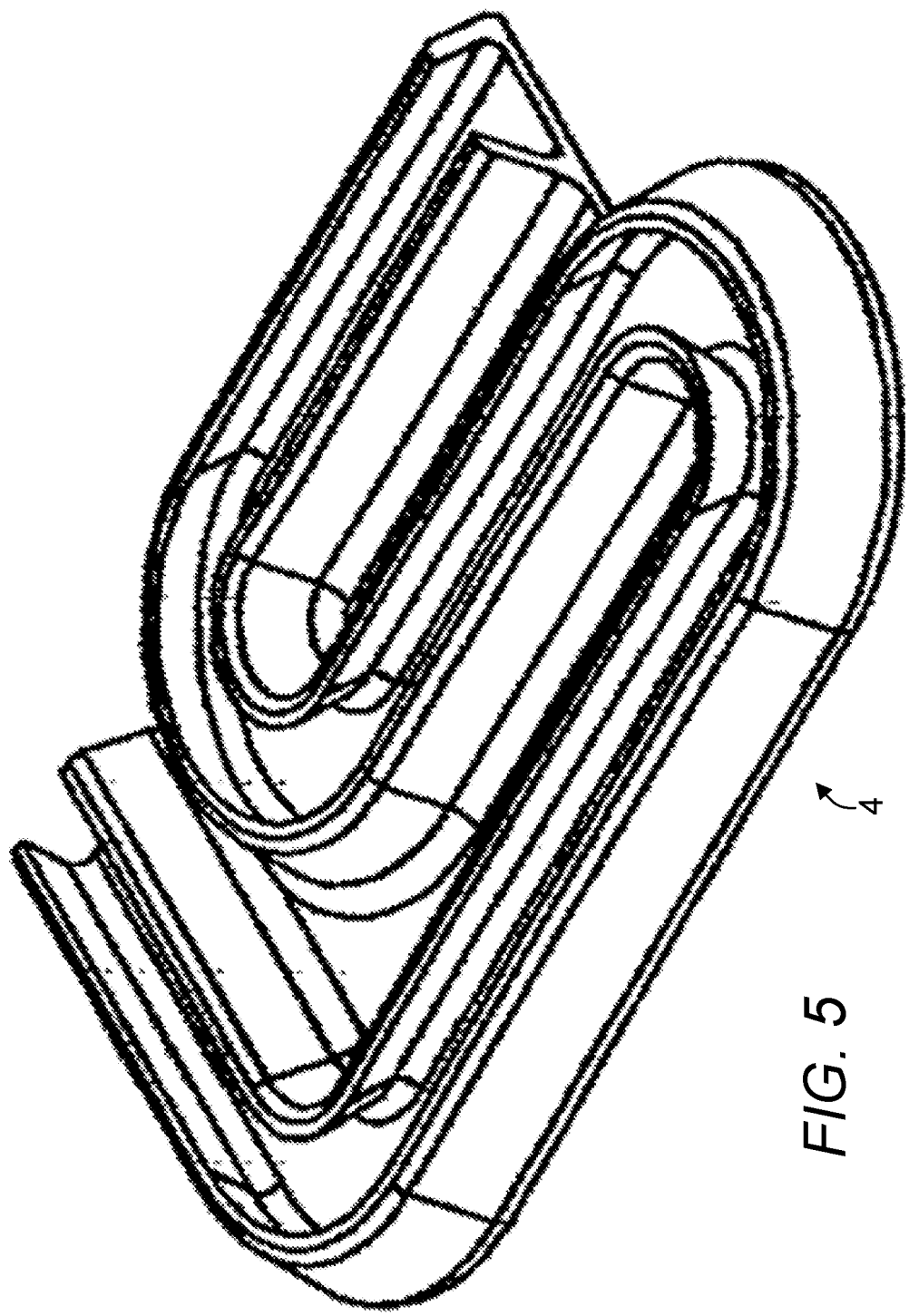
FIG. 5 is a front perspective view of a base member of one embodiment according to a present configurable stand and tie base.
Figure 6:
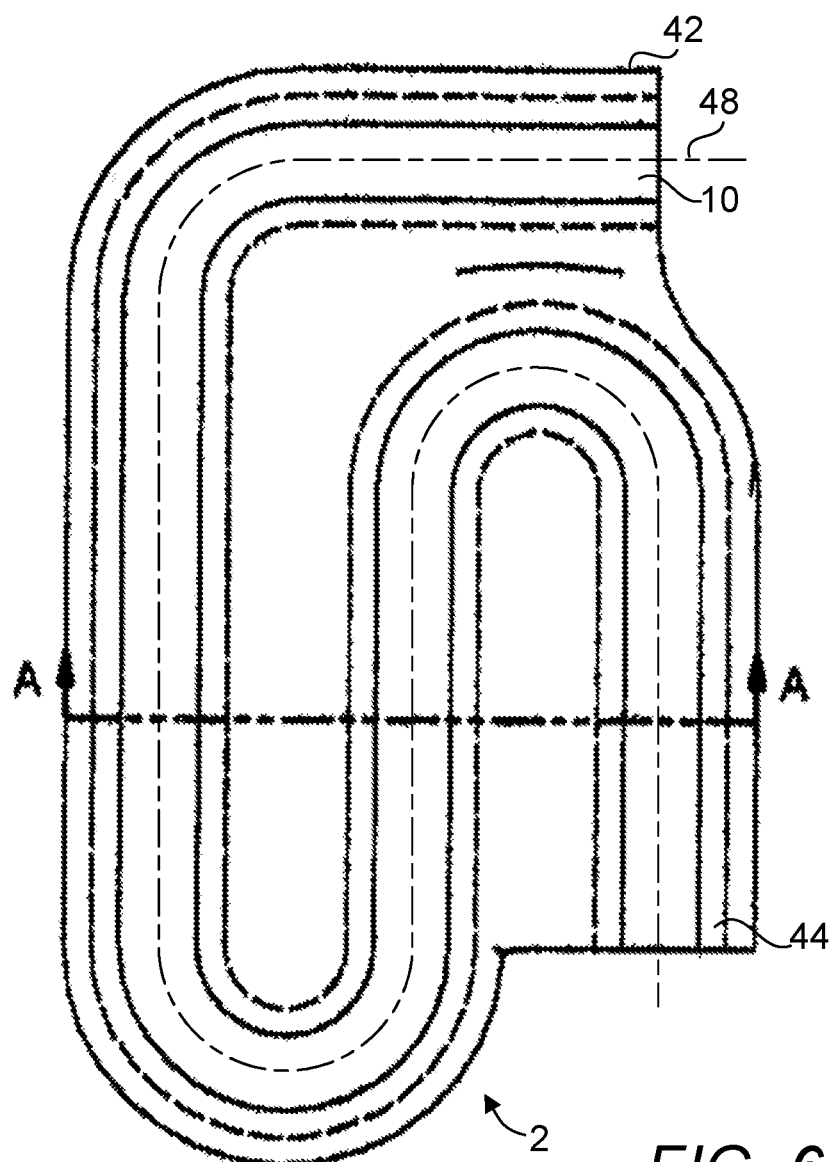
FIG. 6 is a front view of a base member of one embodiment according to a present configurable stand and tie base.
Figure 7:
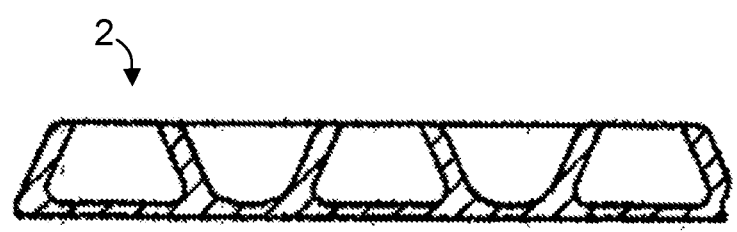
FIG. 7 is a cross-sectional view of a base member of one embodiment according to a present configurable stand and tie base as taken along line A-A of FIG. 6.

FIG. 5 is a front perspective view of a base member of one embodiment according to a present configurable stand and tie base 2. FIG. 6 is a front view of a base member of one embodiment according to a present configurable stand and tie base 2. FIG. 7 is a cross-sectional view of a base member of one embodiment according to a present configurable stand and tie base 2 as taken along line A-A of FIG. 6.

It shall be noted that the path of the channel 10 of the configurable stand and tie base of FIG. 5 differs from the path of the configurable stand and tie base of FIG. 1. The path can be represented by the central axis 48 of the path. It shall be also noted that each path is marked by two ends 42, 44 that are preferably disposed at a right angle with respect to one another. The configurable stand and tie base 2 is preferably attached to an object with at least one of the two ends disposed in a direction parallel to a plane within which a tie is to be manipulated once removed from the channel 10.

Figure 8:
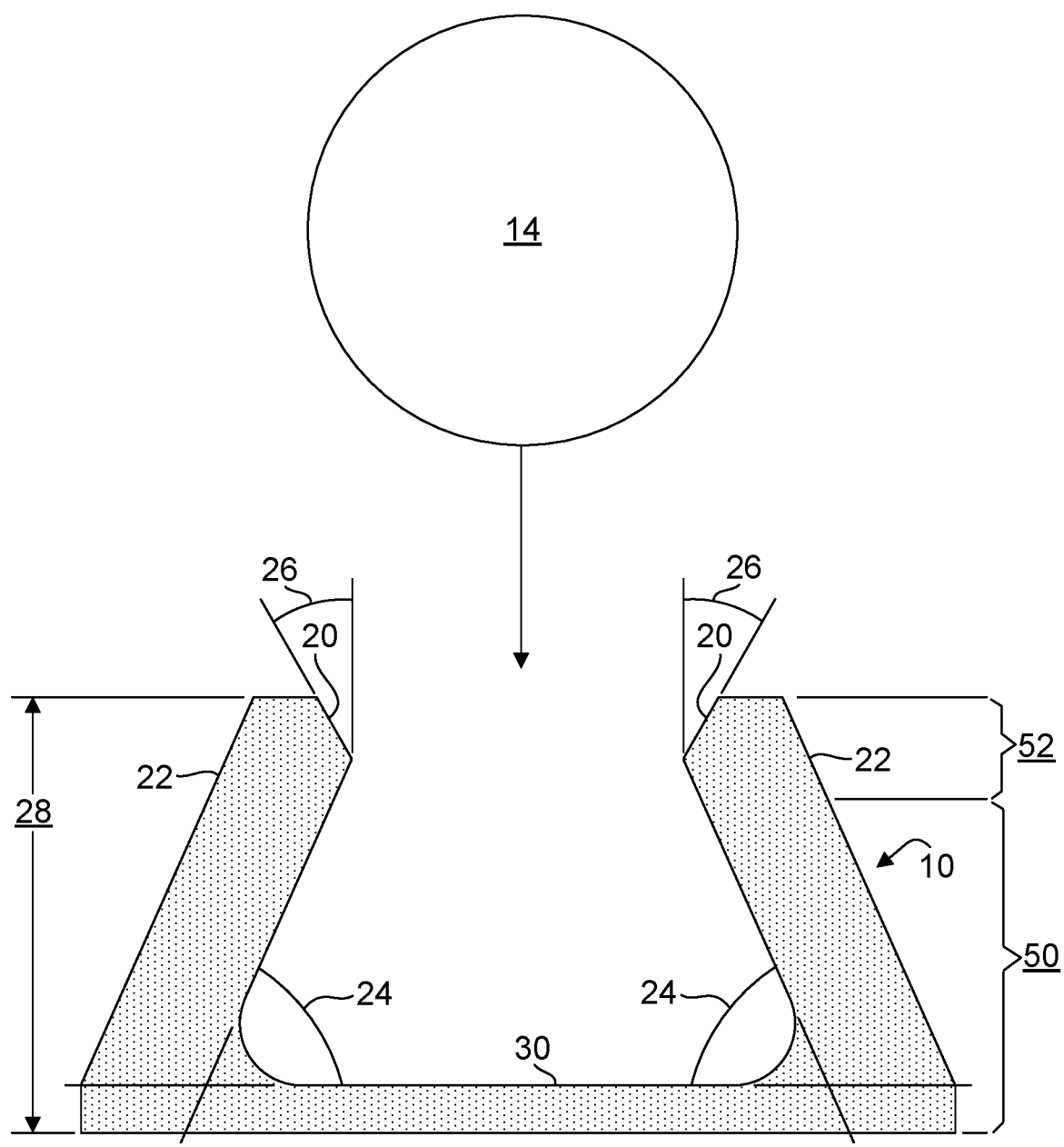
FIG. 8 is a cross-sectional view of one embodiment of a channel formed in a base member of a present configurable stand and tie base depicting a flexible tie directed towards to a neck of the channel to be seated as shown in FIG. 9.
Figure 9:
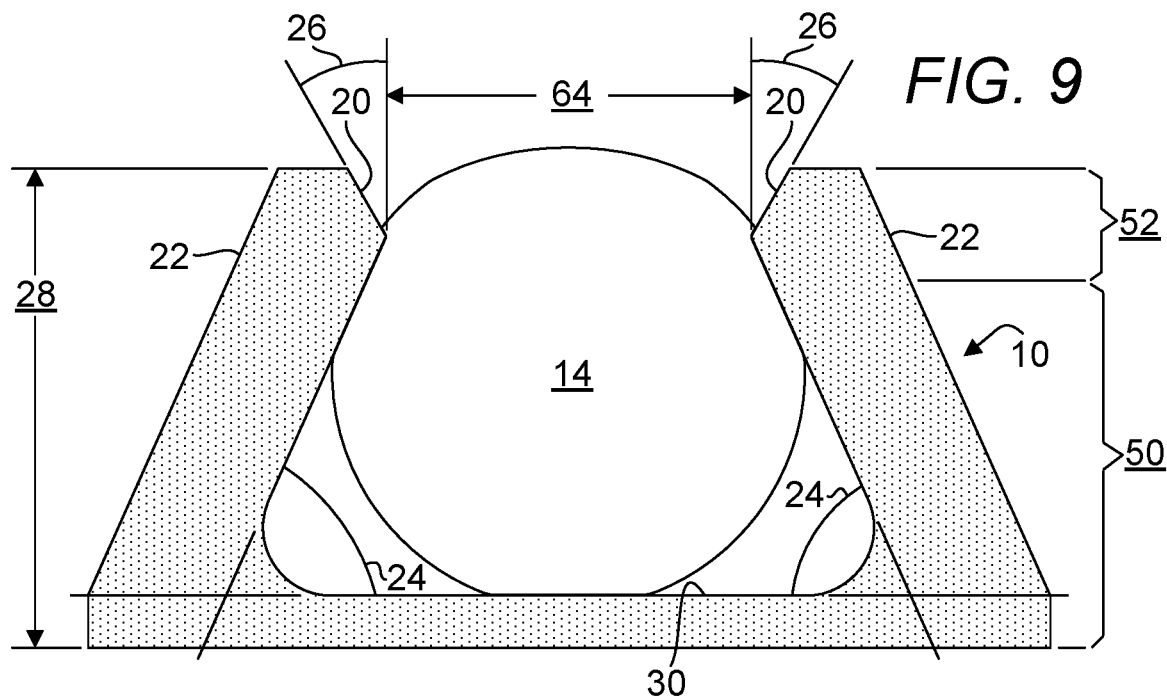
FIG. 9 is a cross-sectional view of a one embodiment of a flexible tie having been seated within the body of a channel of a present configurable stand and tie base.
Figure 10:
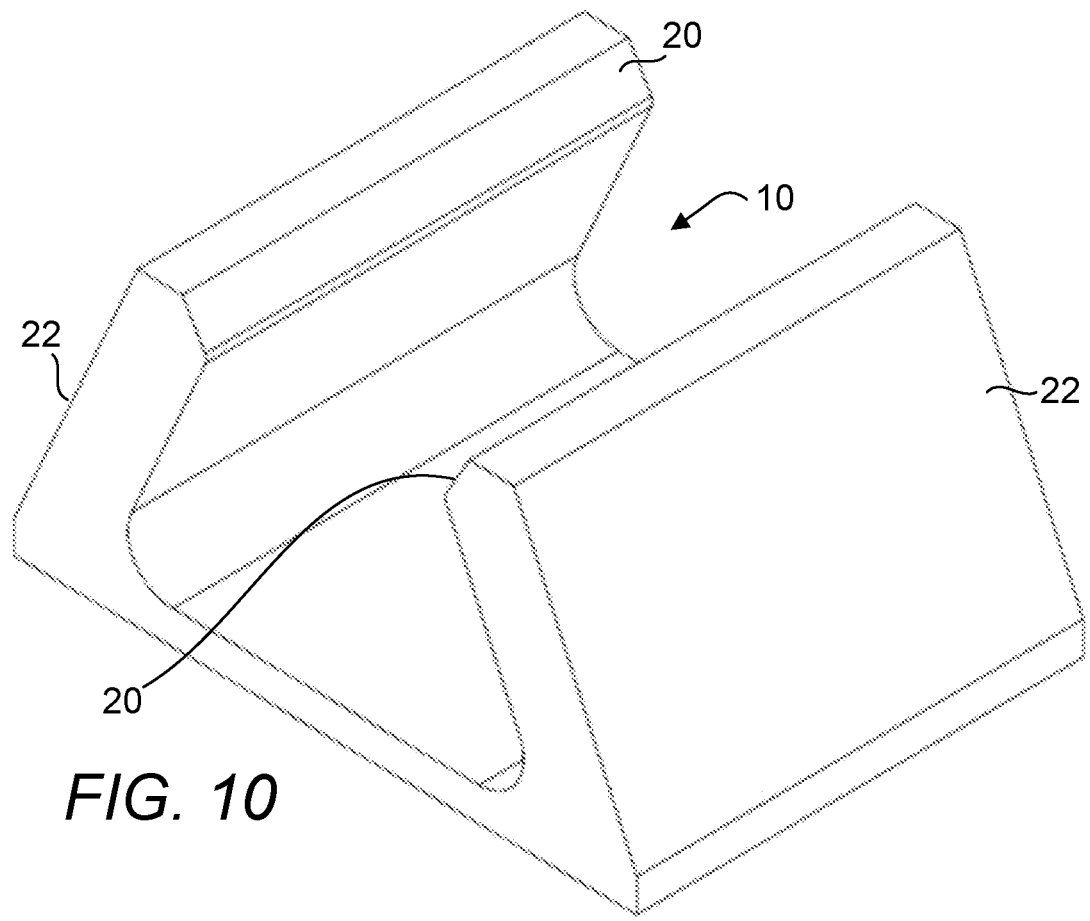
FIG. 10 is a front perspective of a portion of one embodiment of a channel formed in a base member of a present configurable stand and tie base.

FIG. 8 is a cross-sectional view of one embodiment of a channel formed in a base member of a present configurable stand and tie base 2 depicting a flexible tie 14 directed towards to a neck 52 of the channel 10 to be seated as shown in FIG. 9. FIG. 9 is a cross-sectional view of a one embodiment of a flexible tie 14 having been seated within the body 50 of a channel of a present configurable stand and tie base 2. FIG. 10 is a front perspective of a portion of one embodiment of a channel of formed in a base member 4 of a present configurable stand and tie base 2. In one embodiment, the channel includes two walls 22 extending from a base 30 and leaning towards one another to form a cross-sectional profile having a body and a neck that is narrower than the body such that when the flexible tie is inserted within the body through the neck, the flexible tie is retainable within the body. In one embodiment, at least one of the two walls 22 further includes a chamfer 20 disposed on at least one of the two walls 22 for facilitating seating of the flexible tie 14 in the body 50 through the neck 52. As the flexible tie 14 is forced towards the neck 52, the walls 22 tend to flex or spread slightly to allow the flexible tie 14, which also deforms slightly, to enter the cavity of the body 50 and be seated and retained therein. A prying force exerted at an end 38, 40 and directed away from the channel 10, by a user's finger or another tool, enables the end 38, 40 of the flexible 14 to be dislodged from the channel 10. The amount of flexible tie 14 that is dislodged from the channel 10 depends on the need of the user. If the stand needs to be longer to provide a stand that can prop the object at a more severe angle, more of the flexible tie 14 can be dislodged. If the amount of dislodged flexible tie 14 is deemed excessive, more of the dislodged portions of the flexible tie 14 can be reseated. In one embodiment, a width 64 of the neck of the channel is about 0.25 inch. In one embodiment, angle 24, i.e., the angle a wall 22 makes with channel base 30 is about 65 degrees. In one embodiment, the height 28 of the channel 10 is about 0.25 inch. In one embodiment, angle 26, i.e., the angle a chamfer 20 makes with a vertical line is about 25 degrees. In one embodiment, the channel includes at least two substantially parallel portions connected by a turn, wherein a ratio of a radius of the turn to a thickness or diameter 60 of the flexible tie is about 2 to about 1. In one embodiment, the channel includes at least two substantially parallel portions connected by a turn, wherein a ratio of a radius of the turn to a width of the neck is about 1.5 to about 1.

Figure 11:
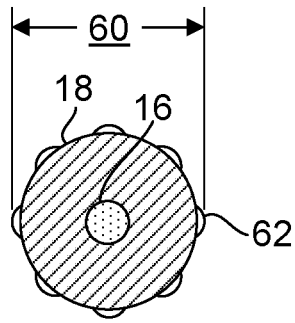
FIG. 11 is a cross-sectional view of one embodiment of a flexible tie.
Figure 12:
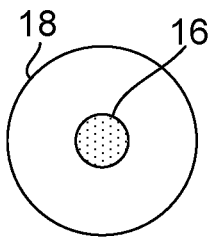
FIG. 12 is a cross-sectional view of one embodiment of a flexible tie.

FIG. 11 is a cross-sectional view of one embodiment of a flexible tie 14. FIG. 12 is a cross-sectional view of one embodiment of a flexible tie 14. Here, each of the flexible ties 14 includes a boning 16, preferably made of a material that is malleable, e.g., a metal, and capable of retaining its shape once manipulated into a particular configuration. The boning 16 is coated with a cover 18 constructed from a deformable material, e.g., a polymeric material, e.g., rubber and plastic, etc., which provides some retaining capability once the flexible tie 14 becomes seated in a channel 10. Referring to FIG. 11, the outer surface of the cover 18 is further enhanced with a surface feature, e.g., bumps and extruded raised portions or other friction-inducing features of the outer surface of the cover 18. The outer diameter 60 of a flexible tie 14 is preferable about 3/32 to 5/8 inch.

Figure 13:
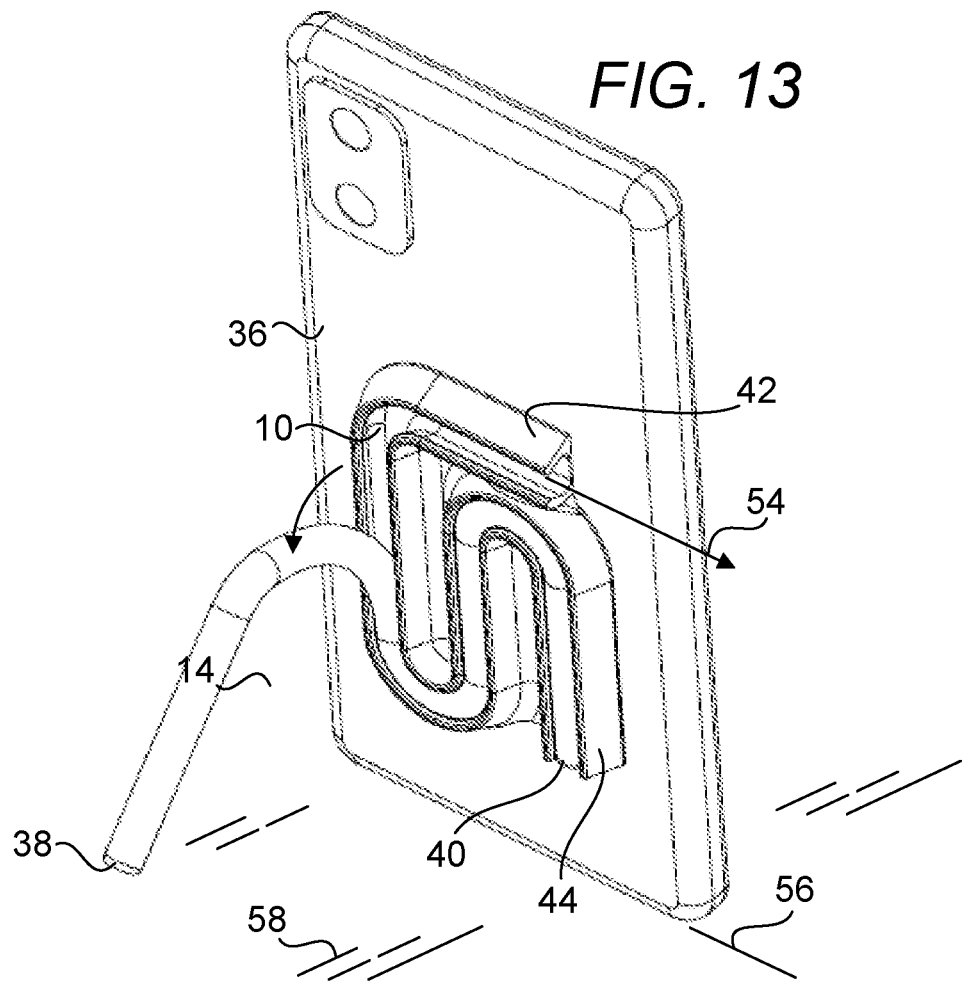
FIG. 13 is a front perspective view of an object supported with a stand of a present configurable stand and tie system.

FIG. 13 is a front perspective view of an object supported with a stand of a present configurable stand and tie system. The object 36 shown herein is a mobile phone although the present configurable stand and tie system can be used to support other lightweight objects as well. At one end 42 of the channel 10, the channel 10 is pointed in direction 54, a direction parallel to one edge of the object 10, an edge represented by line 56 and an edge that is perpendicular to the direction in which the flexible tie 14 is required to be disposed in order to most efficiently support the object 36. In using the present configurable stand and tie as a stand, a portion of the flexible tie 14 is pulled out of the channel 10 from one end 42 of the channel 10 such that one end 38 of the flexible tie 14 rests on a support surface 58.

Figure 14:
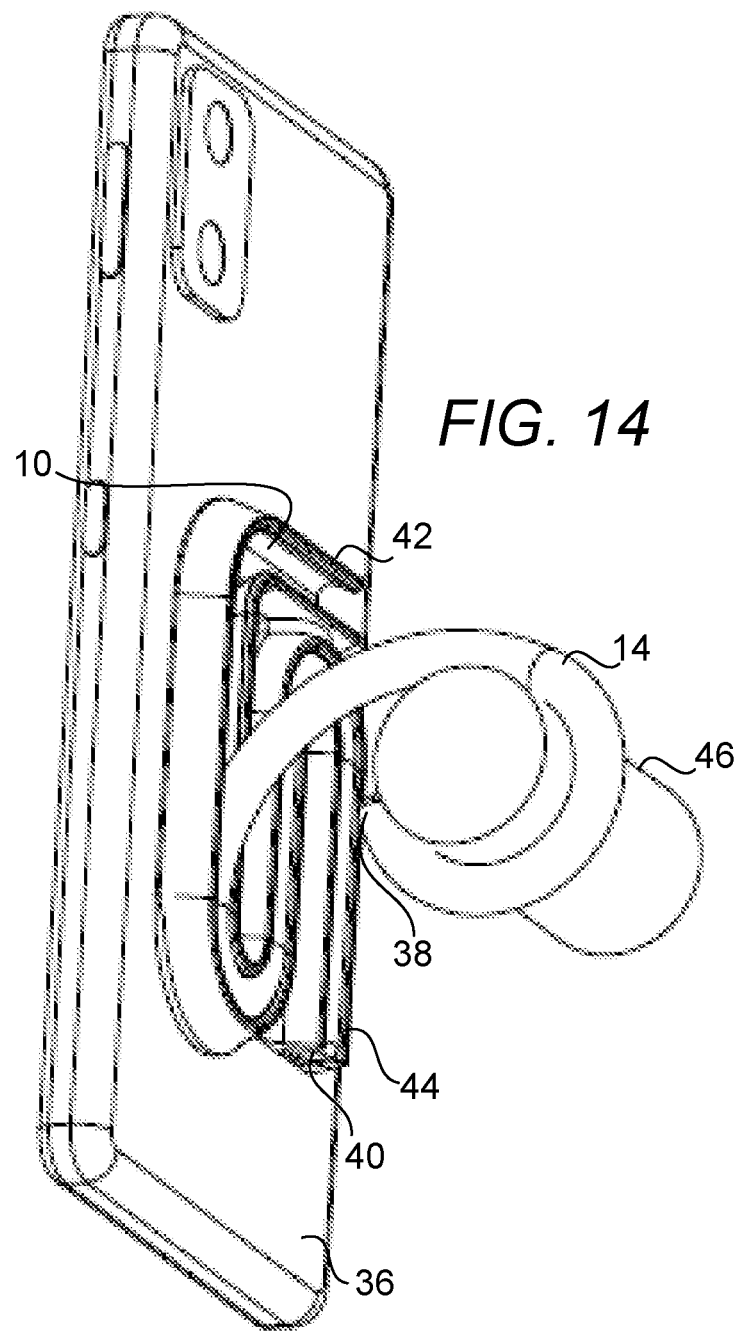
FIG. 14 is a bottom front perspective view of an object supported with a tie of a present configurable stand and tie system.
Figure 15:
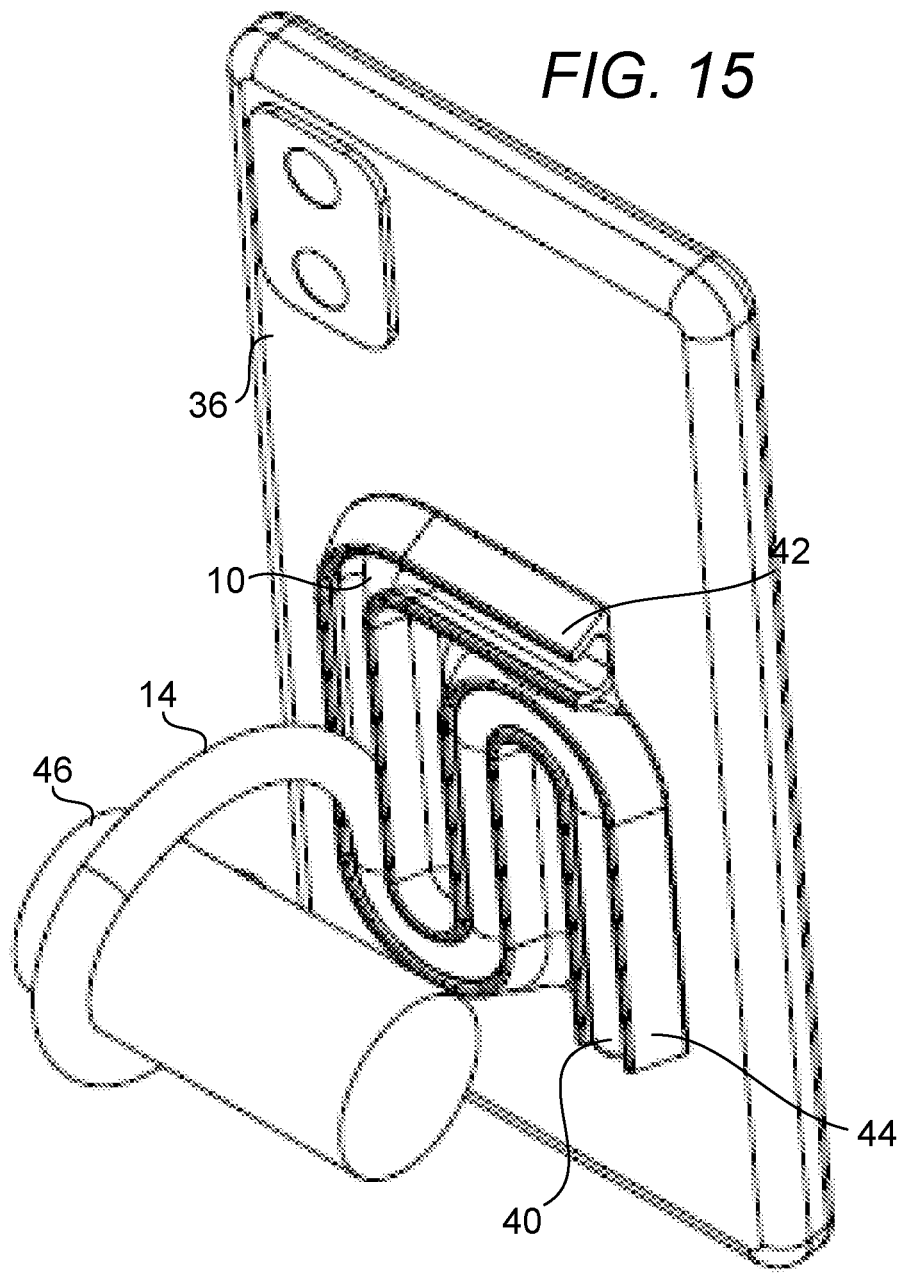
FIG. 15 is a top front perspective view of an object supported with a tie of a present configurable stand and tie system.
Figure 16:
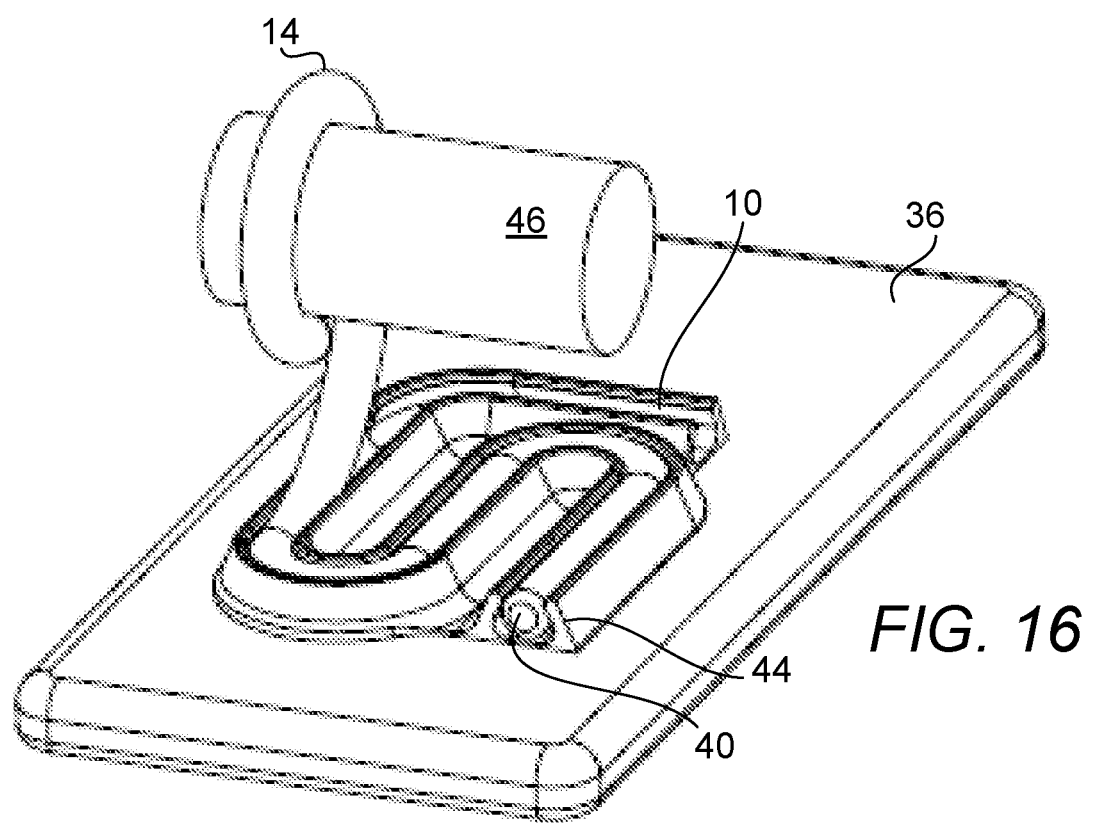
FIG. 16 is a bottom front perspective view of an object supported with a tie of a present configurable stand and tie system.

FIG. 14 is a bottom front perspective view of an object supported with a tie of a present configurable stand and tie system 2. FIG. 15 is a top front perspective view of an object supported with a tie of a present configurable stand and tie system 2. FIG. 16 is a rear perspective view of an object supported with a tie of a present configurable stand and tie system. Again, it shall be noted that the same end 38 of flexible tie 14 is detached from the channel 10 to allow a sufficient length of the flexible tie 14 to be wrapped around a support, i.e., a cylinder 46, e.g., a part of a railing or a tree branch, etc. The cylinder may be disposed vertically, horizontally or in any orientation for the present configurable stand and tie system 2 to be able to still work with the cylinder. The plane in which the detached portion of the flexible tie 14 need not be perpendicular to the plane in which the channel 10 is disposed although the flexible tie 14 is most capable to resist the weight of the object 36 or any other environmental forces, e.g., wind, etc. when disposed in such a manner. The flexible tie 14 is preferably disposed in its entirety in the channel when not in use or partially in the channel while in use although if necessary, a portion of the flexible tie 14 can be disposed in the channel 10 while not in use. Further, the flexible tie 14 may be transported separately from the base member 4 or without the flexible tie 14 being seated in the channel 10 if desired whether or not the flexible tie 14 can be accommodated in its entirety in the channel 10.

Figure 17:
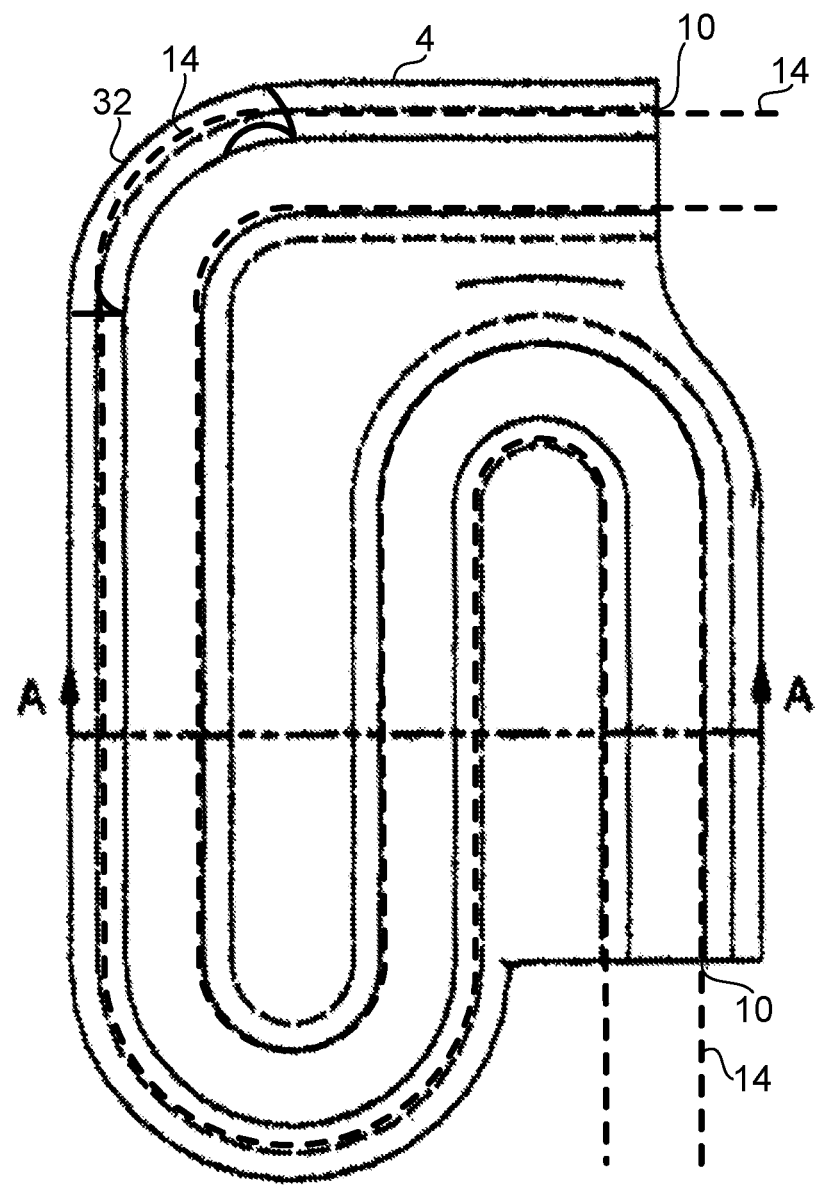
FIG. 17 is a front view of a base member of one embodiment according to a present configurable stand and tie base.

FIG. 17 is a front view of a base member of one embodiment according to a present configurable stand and tie base. It shall be noted that a notch 32 is disposed at a corner of the base member 4. When a flexible tie 14 is disposed in the channel 10, the portion 34 of the flexible tie 14 at the notch 32 protrudes into the notch 32, further securing the flexible tie 14 in the channel 10.

Figure 18:
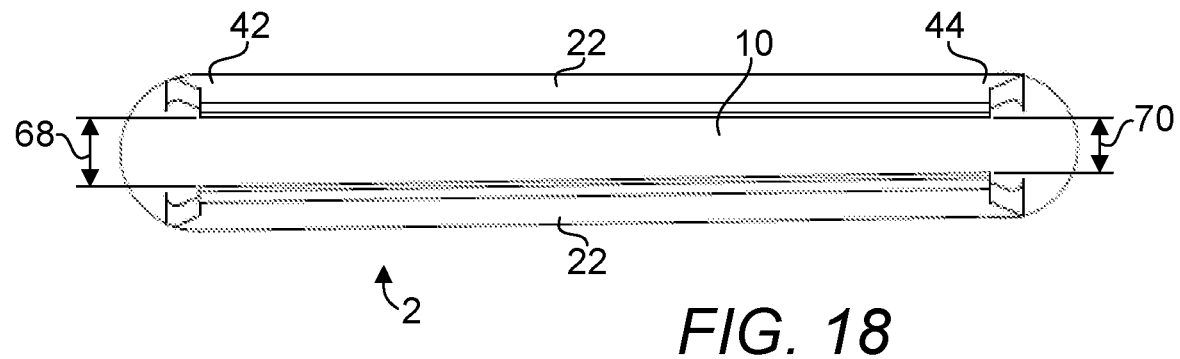
FIG. 18 is a front view of a base member of one embodiment according to a present configurable stand and tie base.
Figure 19:
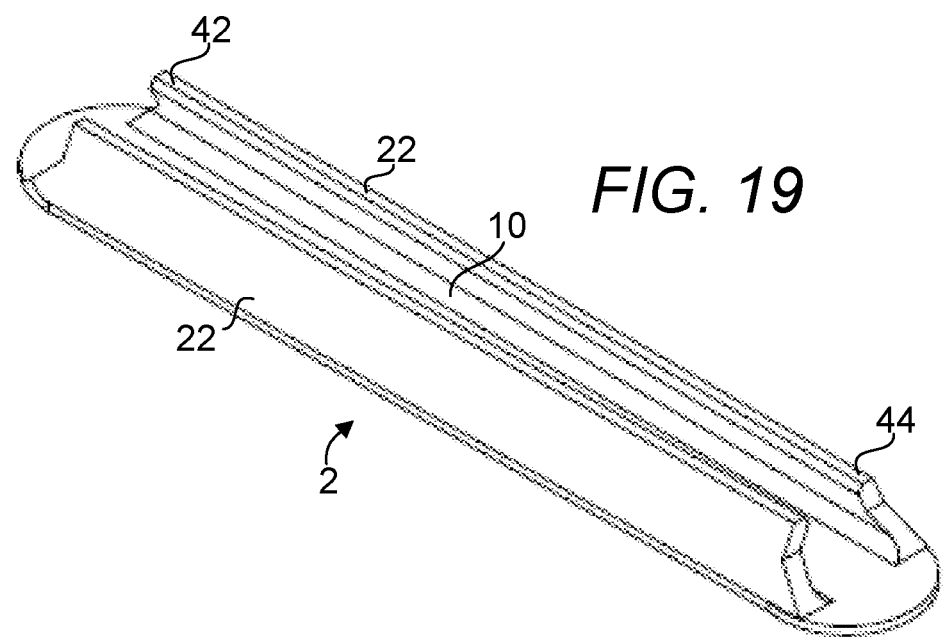
FIG. 19 is a front perspective view of a base member of one embodiment according to a present configurable stand and tie base.

FIG. 18 is a front view of a base member of one embodiment according to a present configurable stand and tie base. FIG. 19 is a front perspective view of a base member of one embodiment according to a present configurable stand and tie base. In the embodiment shown, the channel 10 is disposed in a rectilinear fashion. It shall be noted that, in this embodiment, the channel 10 varies in width along its length although the channel 10 need not be rectilinear to have variable neck opening widths along the length of the channel 10. For instance, the channel width 68 at one end 42 is about 0.24 inches and the channel width 70 on the other end 44 is about 0.19 inches. With this embodiment, a user can arrange the channel in a direction where one end that is more frequently detached to have the larger channel width to facilitate the detachment of one end 42 of the flexible tie 14. As the other end 44 is more narrow, the flexible tie 14 is received more securely on this end 44.

Figure 20:
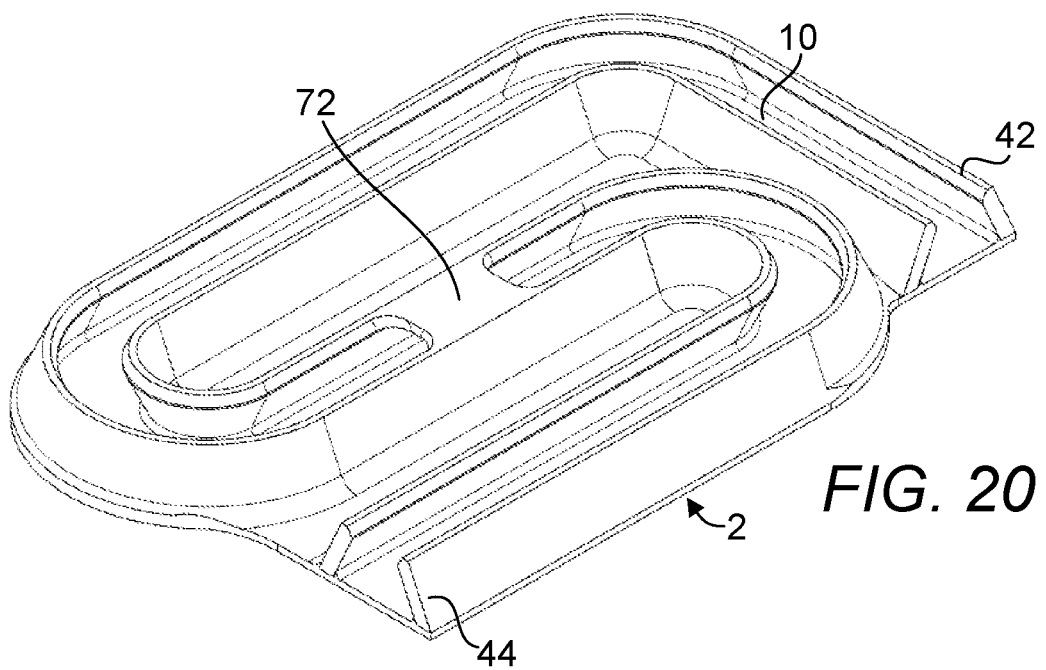
FIG. 20 is a front perspective view of a base member of one embodiment according to a present configurable stand and tie base.

FIG. 20 is a front perspective view of a base member of one embodiment according to a present configurable stand and tie base. It shall be noted that, in this embodiment, a bridge 72 is disposed across a portion of the channel 10 leaving sufficient space for a flexible tie to be threaded through. This bridge can be formed as a fixed rigid and integral piece as shown or a removable piece, e.g., with a hinge connection such that the bridge can be swung out of the way to avoid the need for a flexible tie to be threaded through the opening formed by the bridge 72 and the channel 10.

Figure 21:
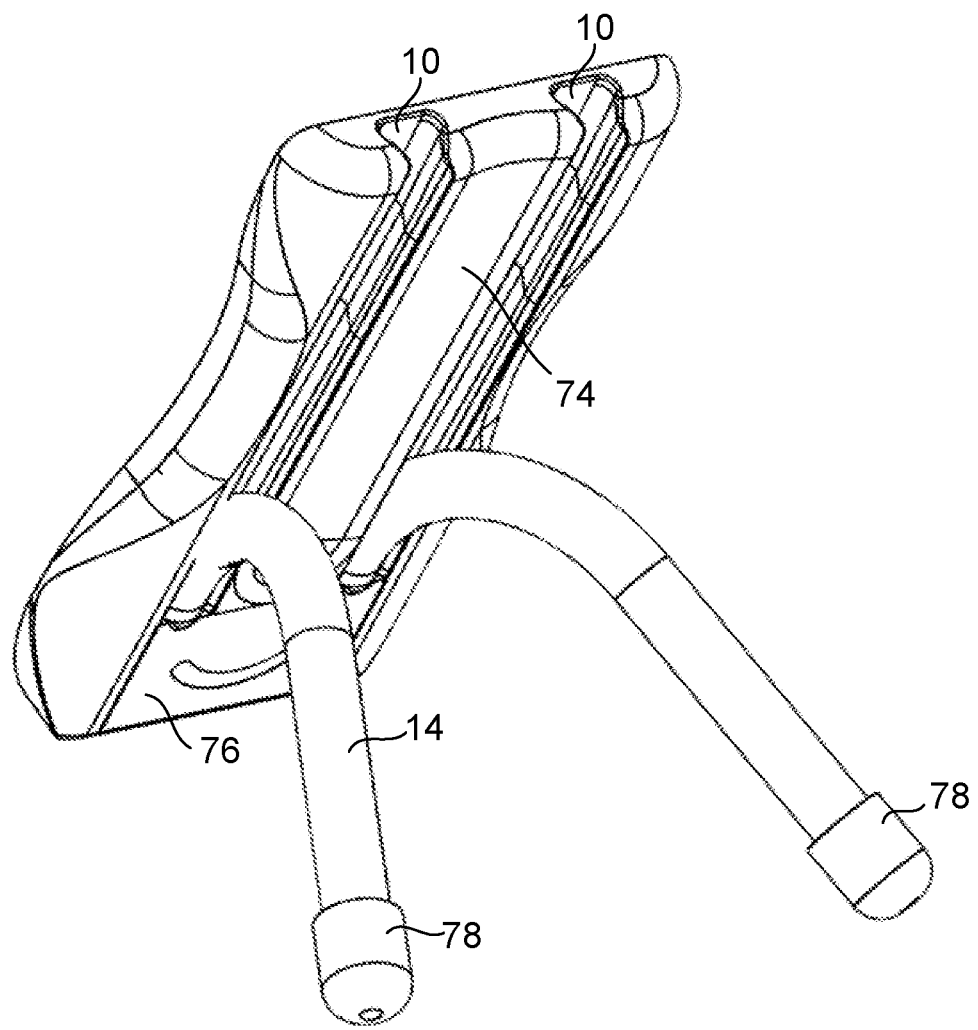
FIG. 21 is a front perspective view of a base member of one embodiment according to a present configurable stand and tie base.
Figure 22:
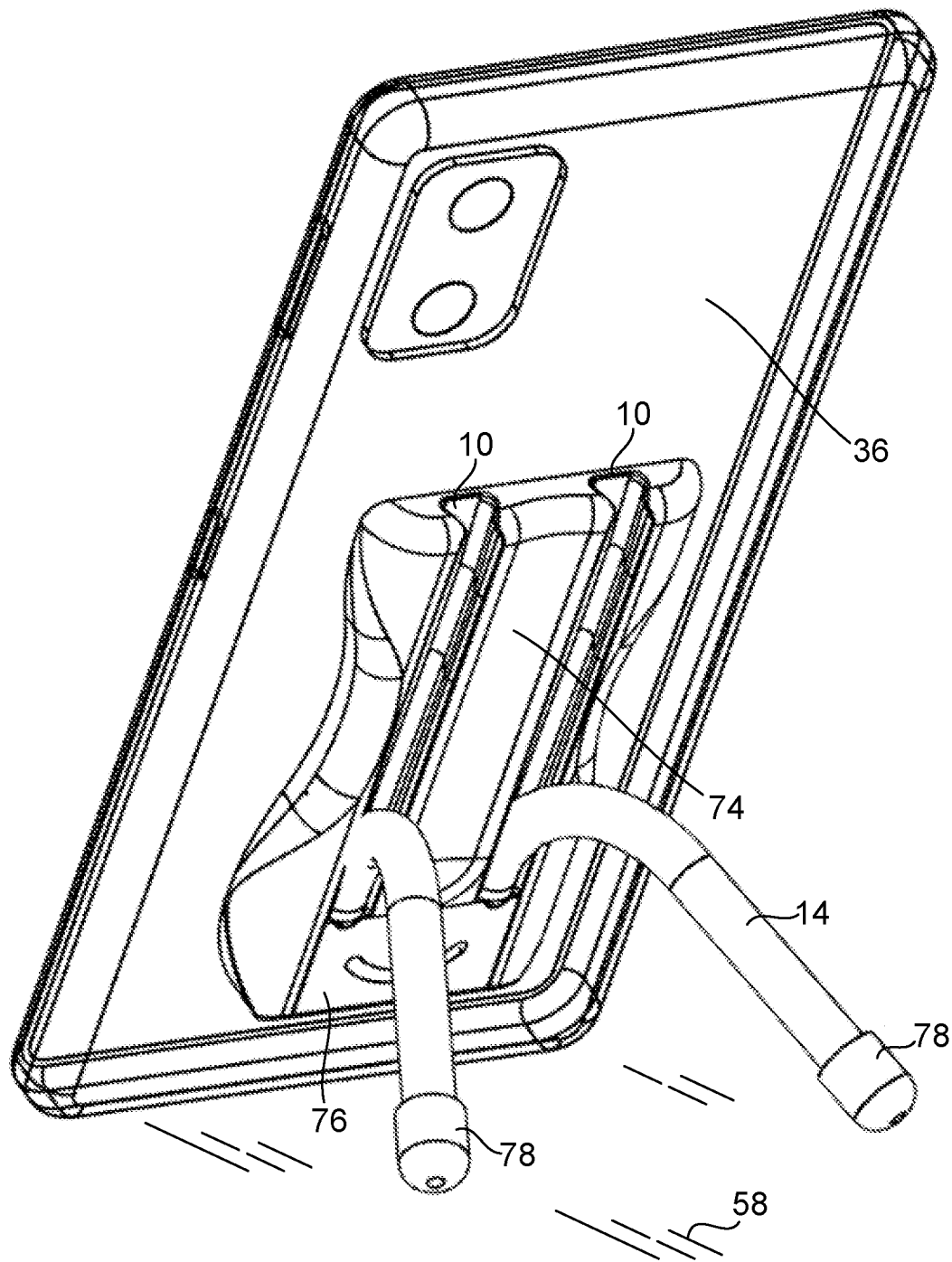
FIG. 22 is a front perspective view of an object supported with a stand of a present configurable stand and tie system.
Figure 23:
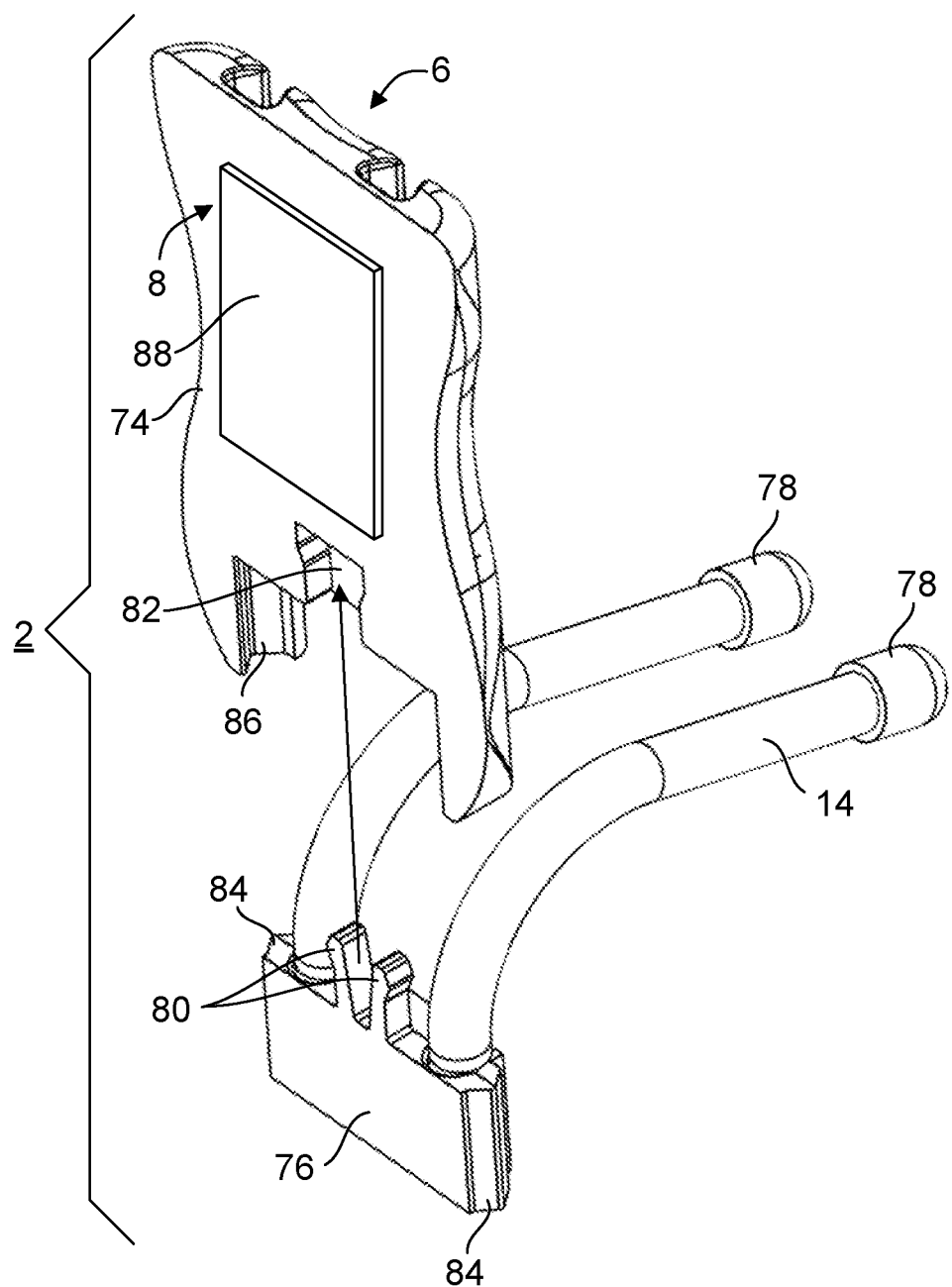
FIG. 23 is a top rear perspective view of a base member of one embodiment according to a present configurable stand and tie base with a first portion of the base member shown separated from a second portion of the base member.
Figure 24:
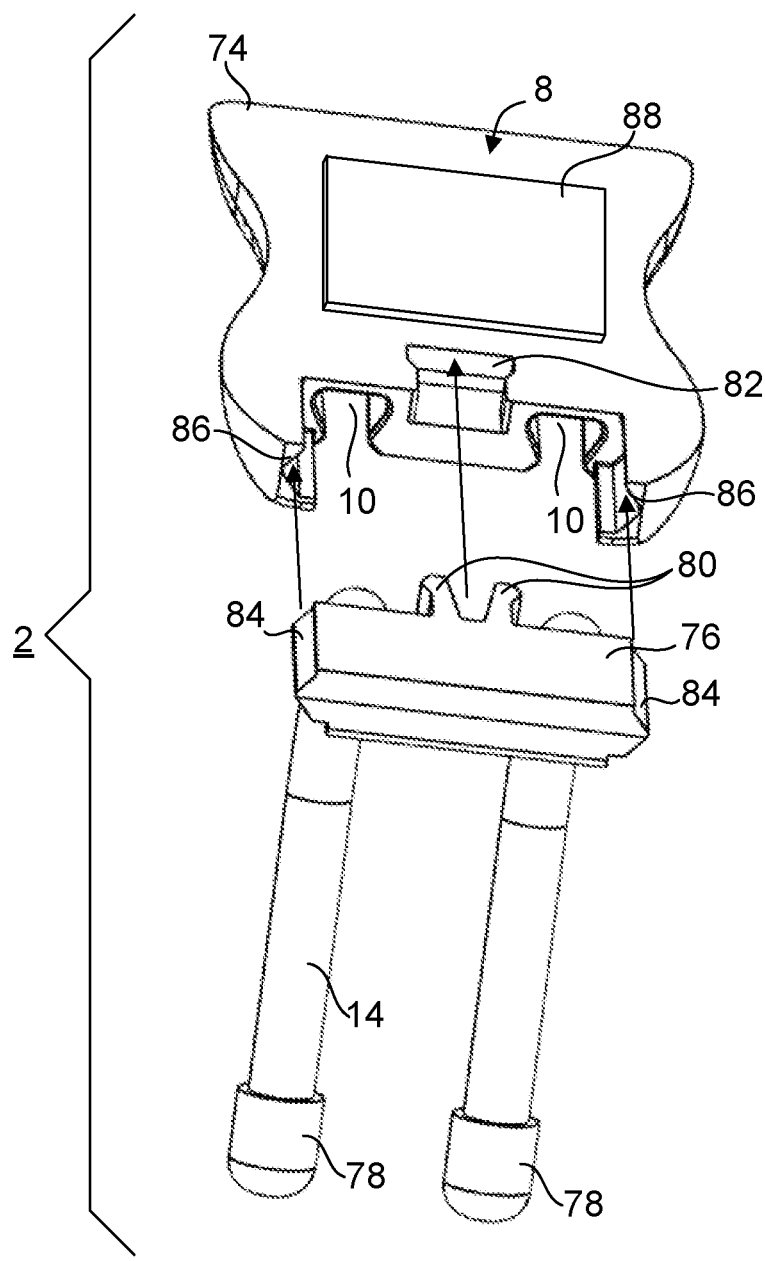
FIG. 24 is a bottom rear perspective view of a base member of one embodiment according to a present configurable stand and tie base with a first portion of the base member shown separated from a second portion of the base member.
Figure 25:
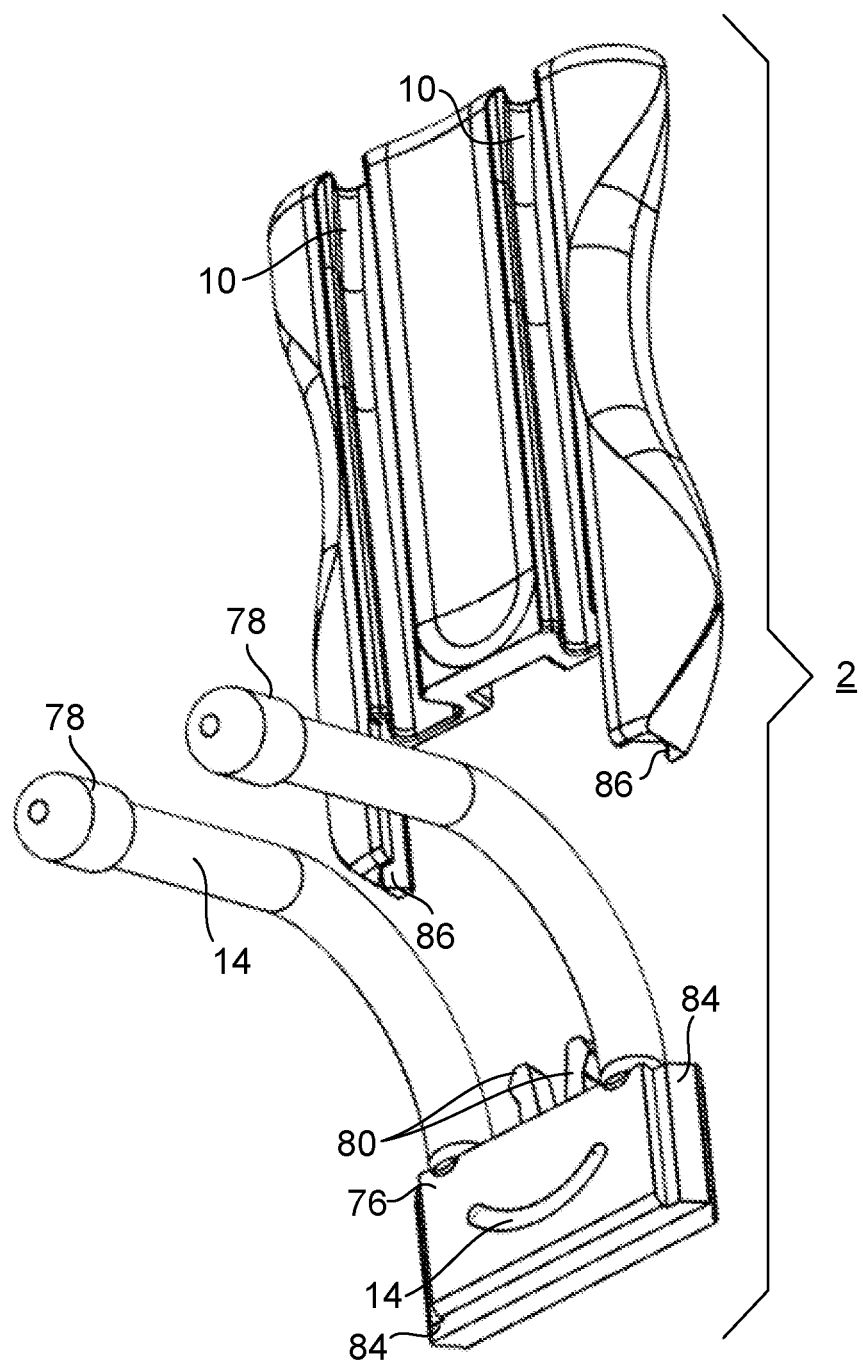
FIG. 25 is a bottom front perspective view of a base member of one embodiment according to a present configurable stand and tie base with a first portion of the base member shown separated from a second portion of the base member.
Figure 26:
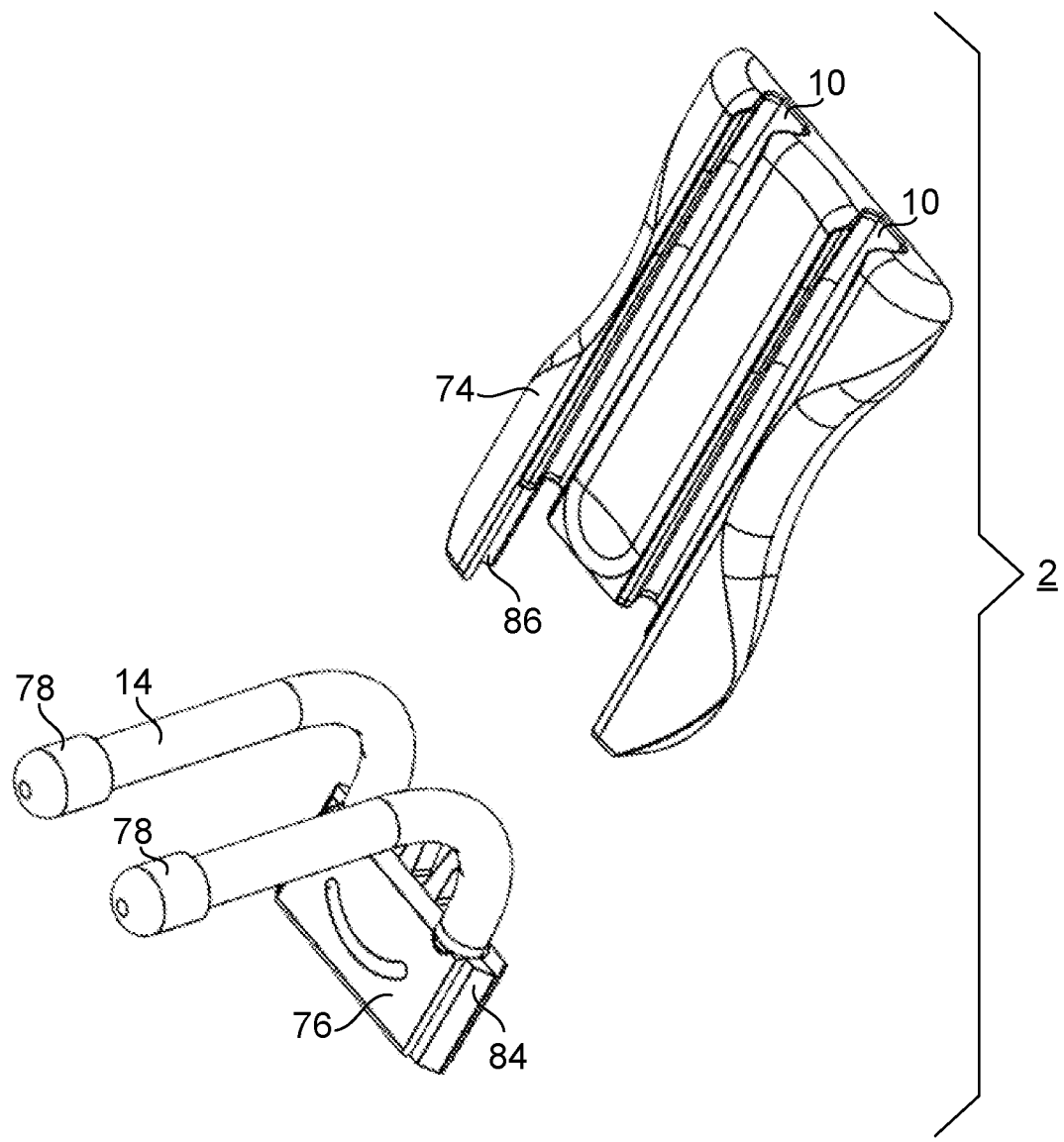
FIG. 26 is a top front perspective view of a base member of one embodiment according to a present configurable stand and tie base with a first portion of the base member shown separated from a second portion of the base member.

FIG. 21 is a front perspective view of a base member of one embodiment according to a present configurable stand and tie base. FIG. 22 is a front perspective view of an object 36 supported with a stand of a present configurable stand and tie system. FIG. 23 is a top rear perspective view of a base member of one embodiment according to a present configurable stand and tie base with a first portion 74 of the base member shown separated from a second portion 76 of the base member. FIG. 24 is a bottom rear perspective view of a base member of one embodiment according to a present configurable stand and tie base with a first portion 74 of the base member shown separated from a second portion 76 of the base member. FIG. 25 is a bottom front perspective view of a base member of one embodiment according to a present configurable stand and tie base with a first portion 74 of the base member shown separated from a second portion 76 of the base member. FIG. 26 is a top front perspective view of a base member of one embodiment according to a present configurable stand and tie base with a first portion 74 of the base member shown separated from a second portion 74 of the base member. In this embodiment, the base member is formed of two separable portions, the first portion 74 of which is configured to be removable from the second portion 76, therefore making the second portion 76 serve as a "cartridge" that is replaceable should the structure carried on the second portion or the cartridge becomes worn and another second portion carrying a different tool is desired. In one embodiment, an adhesive 88 is disposed on a rear surface of the first portion to allow the first portion to be attached to an object 36, e.g., a mobile phone or a protective case of the mobile phone. In one embodiment, the adhesive 88 is preferably provided as an adhesive strip, e.g., a double-sided adhesive strip or tape. Each adhesive surface is protected with a removable film that is removed and discarded prior to the use of the tape. In one embodiment, the first portion 74 is configured to be removably attached to the second portion 76 with a male-female buckle pair. Here, a make buckle 80 is disposed on one end of the second portion 76 while a female buckle 82 is disposed on one end of the base member. To facilitate the insertion of the second portion 76 to be latched with the first portion 74, the male buckle 80 is inserted in the female buckle 82 with the tongues 84 disposed on each lateral edge of the second portion 76 aligned with the grooves 86 of the first portion to cause the prongs of the male buckle 80 to be compressed laterally before being eased into a hole in the female buckle 82 such that the second portion can be seated securely. To remove the second portion 76 from the first portion 74, the second portion 76 is pulled away from the first portion 74 in the opposite direction to the direction in which the second portion 76 is seated in the first portion 74. A pull on the second portion causes the prongs of the male buckle to assume a narrower posture, eventually clearing the hole of the female buckle 82 to be released. In the embodiment shown, each end of the flexible tie is capped with an end cap 78 that is rounded to provide a surface with sufficient grip on any surfaces the flexible tie may come in contact with. In the embodiment shown throughout FIGS. 21-26, only one flexible tie 14 is used to provide two support points as one flexible tie 14 is bent at substantially its midpoint to provide two support points. In one embodiment not shown, the present configurable stand and tie is provided with more than one separately-available flexible ties 14 held together by a portion of the base member.

Figure 27:
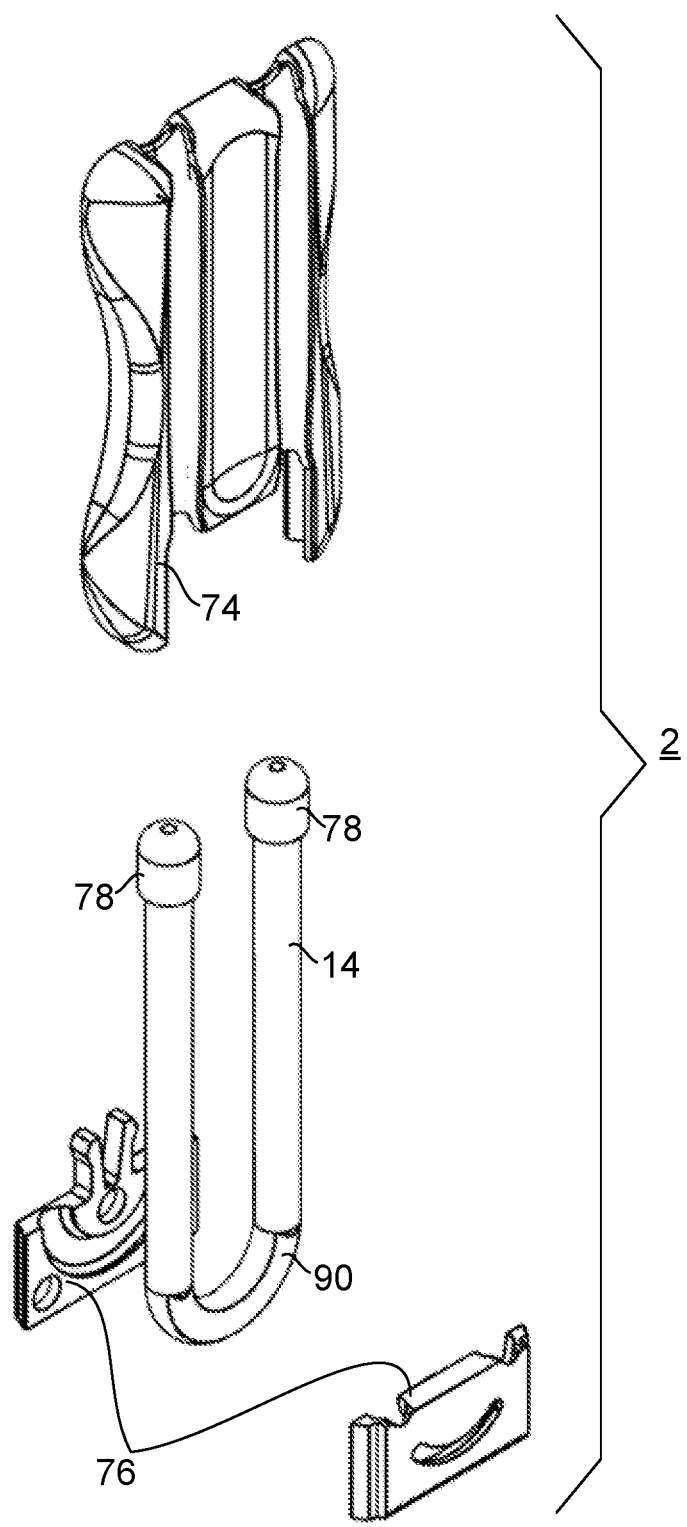
FIG. 27 is a top front perspective view of a base member of one embodiment according to a present configurable stand and tie base with a first portion of the base member shown separated from a second portion of the base member composed of a pair of jaws configured to secure a flexible tie.
Figure 28:
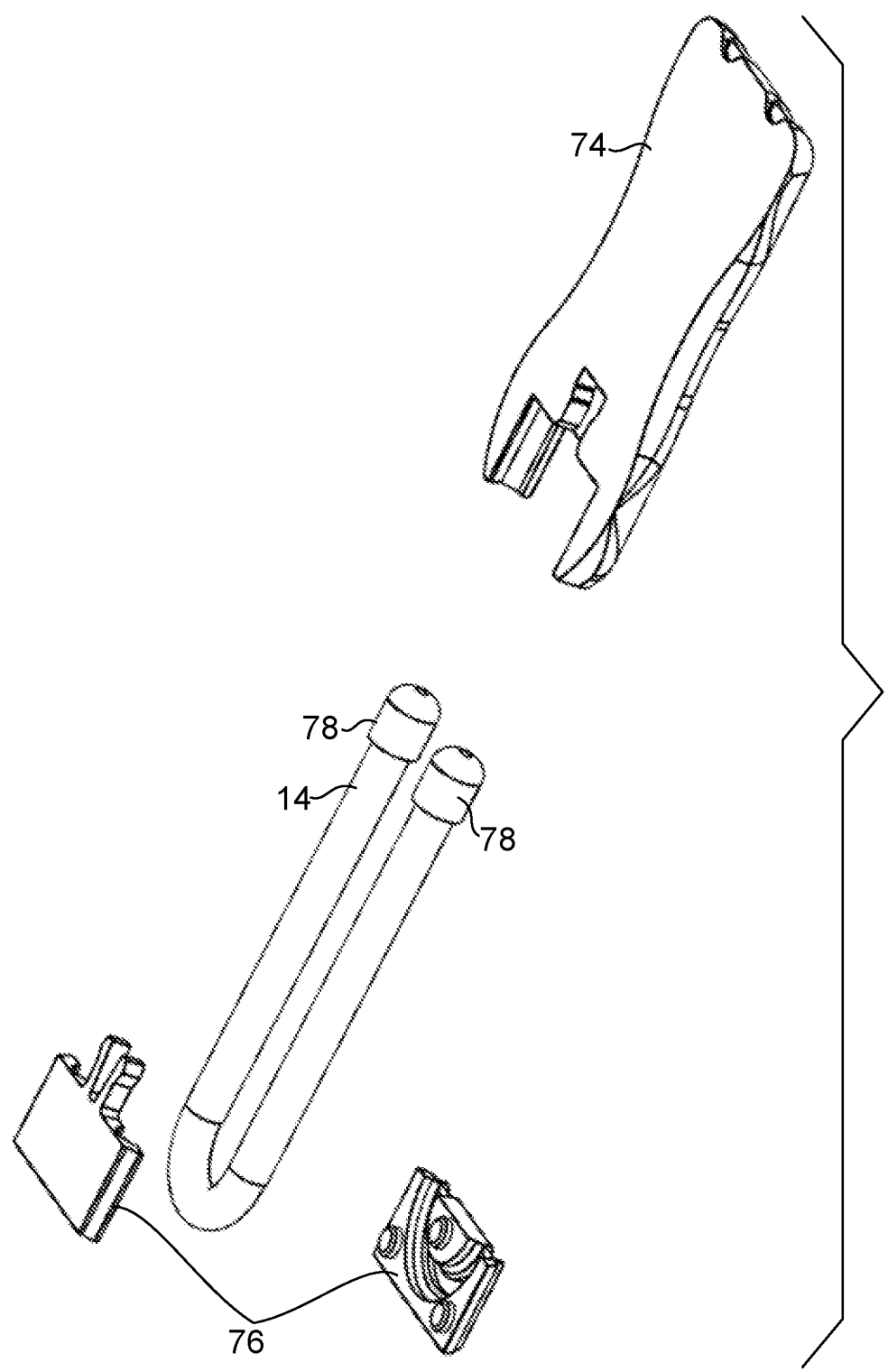
FIG. 28 is a top rear perspective view of a base member of one embodiment according to a present configurable stand and tie base with a first portion of the base member shown separated from a second portion of the base member composed of a pair of jaws configured to secure a flexible tie.

FIG. 27 is a top front perspective view of a base member of one embodiment according to a present configurable stand and tie base with a first portion of the base member shown separated from a second portion of the base member composed of a pair of jaws configured to secure a flexible tie. FIG. 28 is a top rear perspective view of a base member of one embodiment according to a present configurable stand and tie base with a first portion of the base member shown separated from a second portion of the base member composed of a pair of jaws configured to secure a flexible tie. It shall be noted that in this embodiment, the second portion 76 includes a pair of jaws configured to clamp on a portion of a flexible tie, securing the flexible tie to the second portion at its bend. Referring to FIG. 28, it shall be noted that the portion 90 of the flexible tie that is clamped is reduced in size to allow the second portion to stay within a desired size.

Figure 29:
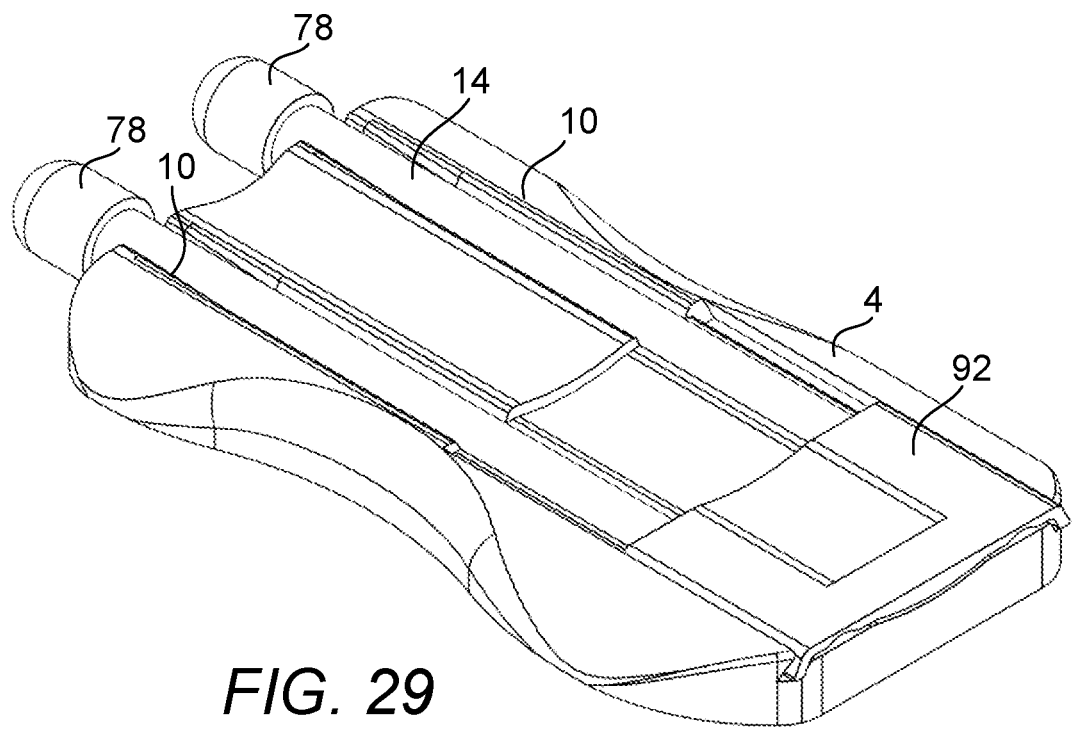
FIG. 29 is a bottom front perspective view of a base member of one embodiment according to a present configurable stand and tie base with a slider disposed in a position to provide a range of adjustments allowable of the flexible tie.
Figure 30:
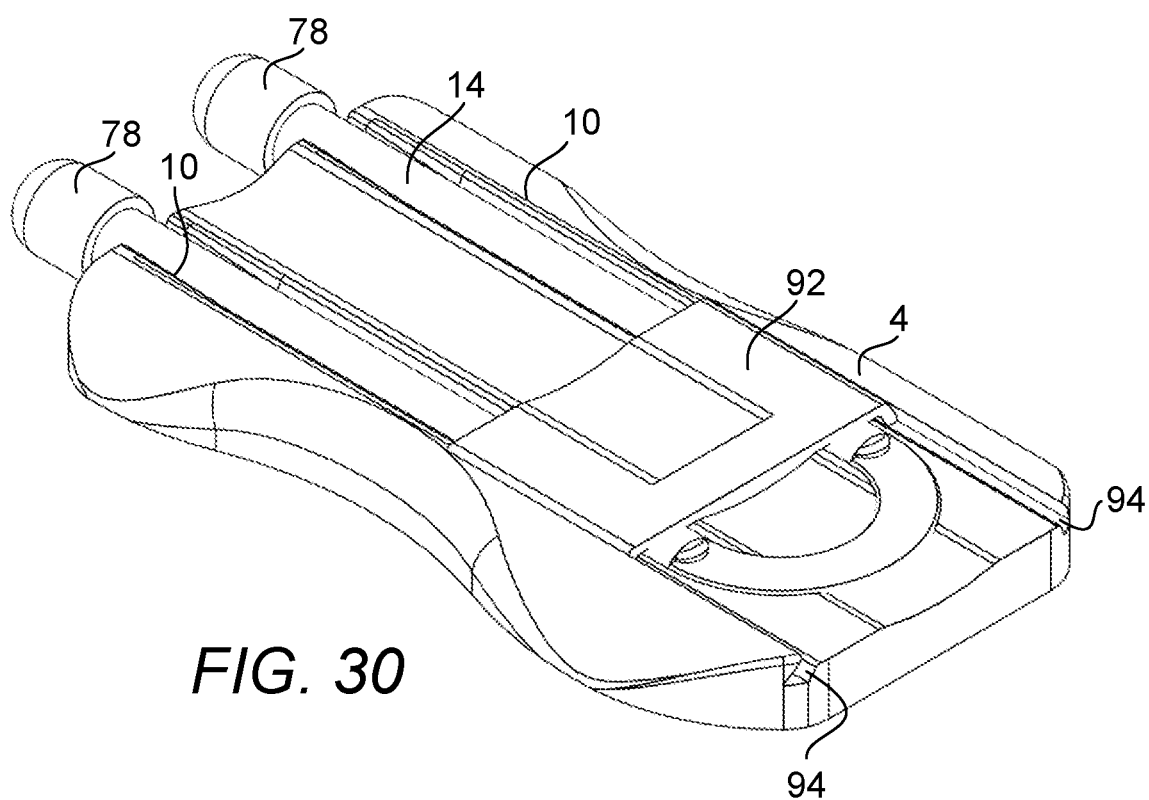
FIG. 30 is a bottom front perspective view of a base member of one embodiment according to a present configurable stand and tie base with a slider disposed in a position to provide a range of adjustments allowable of the flexible tie.

FIG. 29 is a bottom front perspective view of a base member of one embodiment according to a present configurable stand and tie base with a slider disposed in a position to provide a range of adjustments allowable of the flexible tie. FIG. 30 is a bottom front perspective view of a base member of one embodiment according to a present configurable stand and tie base with a slider disposed in a position to provide a range of adjustments allowable of the flexible tie. Here, the base member 4 is provided as a single unit with one or more channels 10 disposed therein. A U-shaped channel 10 is provided to allow a flexible tie 14 to be stowed in the channel 10 while not in use. A slider 92 is configured to assume two positions each shown in FIG. 29 and FIG. 30 while its lateral edges are disposed in and guided by the grooves 94. In the slider position shown in FIG. 29, a larger portion of the flexible tie 14 is exposed, allowing more of the flexible tie 14 to be utilized for an application. If an effectively stiffer flexible tie is desired, the slider 92 can be disposed in the position shown in FIG. 30 to limit the portion of flexible tie 14 that can be removed from the channel 10 to be utilized in an application. Again, in one embodiment, the channel 10 includes a cross-sectional profile having a body and a neck that is narrower than the body such that when the flexible tie is inserted within the body through the neck, the flexible tie is retainable within the body.

Figure 31:
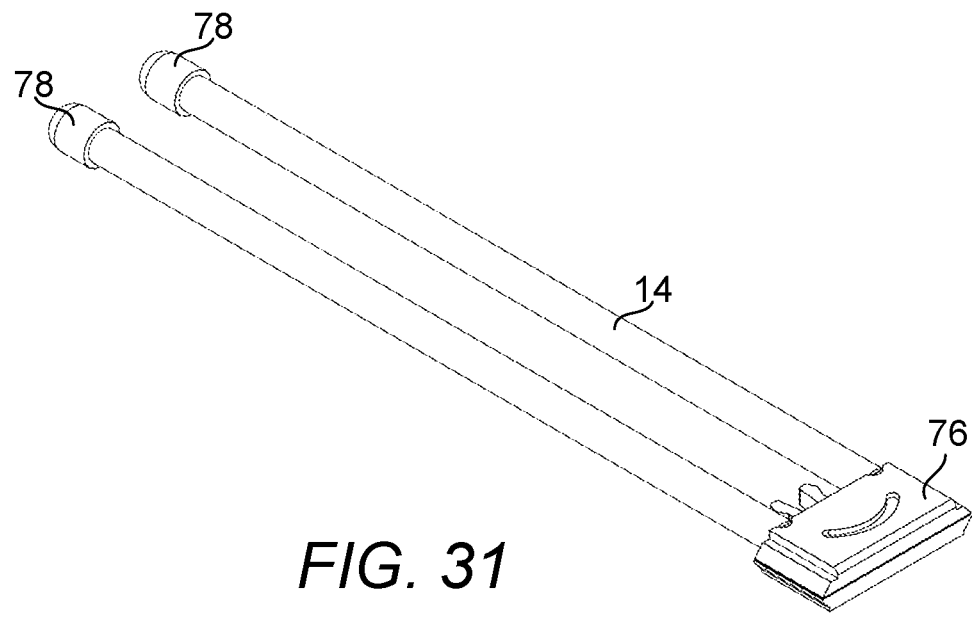
FIG. 31 is a bottom front perspective view of a second portion of a base member depicting a flexible tie of a length that is different from those disclosed in FIGS. 21-30.
Figure 32:
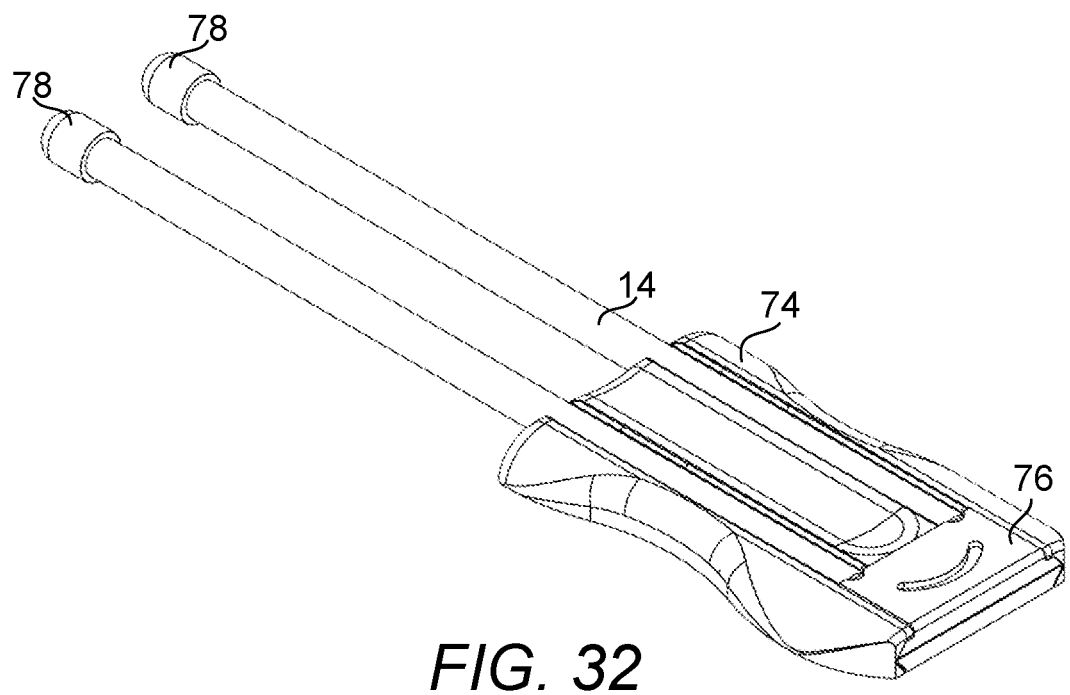
FIG. 32 is a bottom front perspective view of a base member depicting a second portion shown in FIG. 31 having been coupled with a first portion to form the base member.

FIG. 31 is a bottom front perspective view of a second portion of a base member depicting a flexible tie of a length that is different from those disclosed in FIGS. 21-30. FIG. 32 is a bottom front perspective view of a base member depicting a second portion shown in FIG. 31 having been coupled with a first portion to form the base member. It shall be noted that, by disposing a base member in two portions, one of which can be fixedly attached to an object the base member is configured to support while the other portion can be changed out with another portion that is suitable for an application at hand. Here, the flexible tie provided by the second portion is longer than those shown elsewhere herein, therefore allowing more flexibility in the way an object can be supported by the present configurable stand and tie base.

Figure 33:
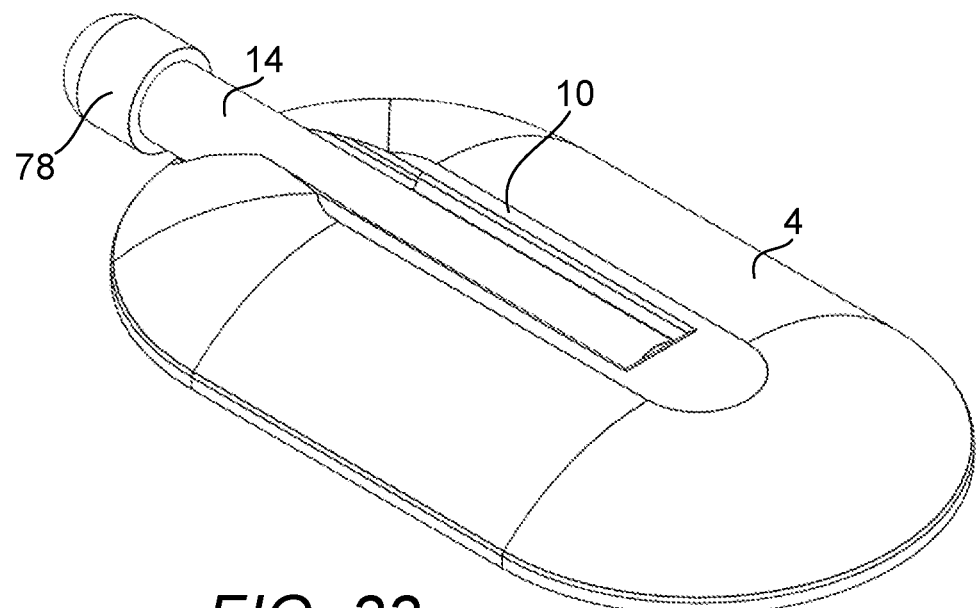
FIG. 33 is a top front perspective view of a base member of one embodiment according to a present configurable stand and tie base.
Figure 34:
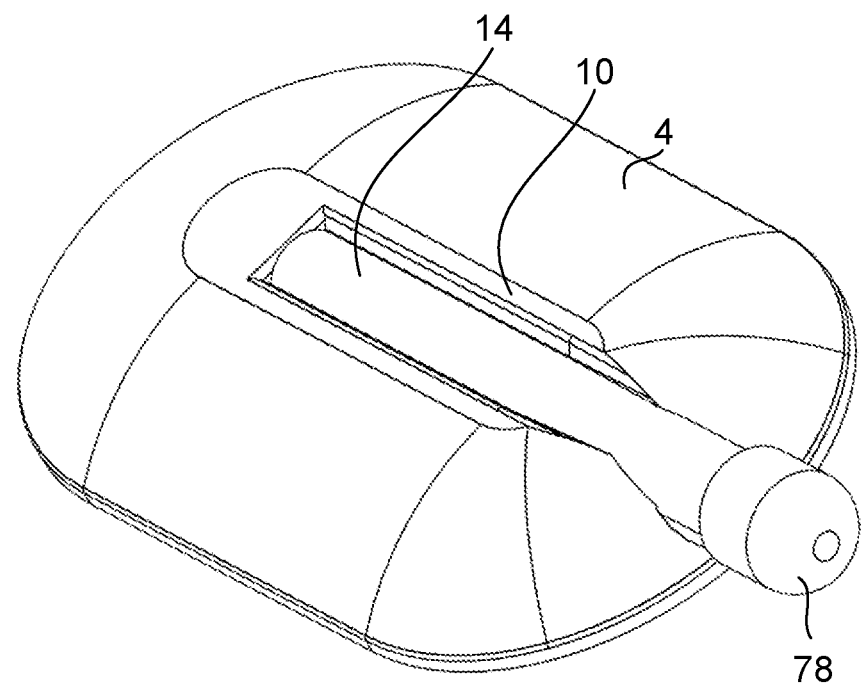
FIG. 34 is a bottom front perspective view of a base member of one embodiment according to a present configurable stand and tie base.

FIG. 33 is a top front perspective view of a base member of one embodiment according to a present configurable stand and tie base. FIG. 34 is a bottom front perspective view of a base member of one embodiment according to a present configurable stand and tie base. Here, only one flexible tie is provided and the base member 4 is again configured to be securely attached to an object to be supported, e.g., with an adhesive. With only one free end of a flexible tie, the present configurable stand and tie base is compact and suitable for supporting any objects requiring only one support point, e.g., a mobile phone. The present configurable stand and tie base may also be provided with a longer flexible tie such that the tie may be bent to form a shape that provides a wider support base instead of a point.

Figure 35:
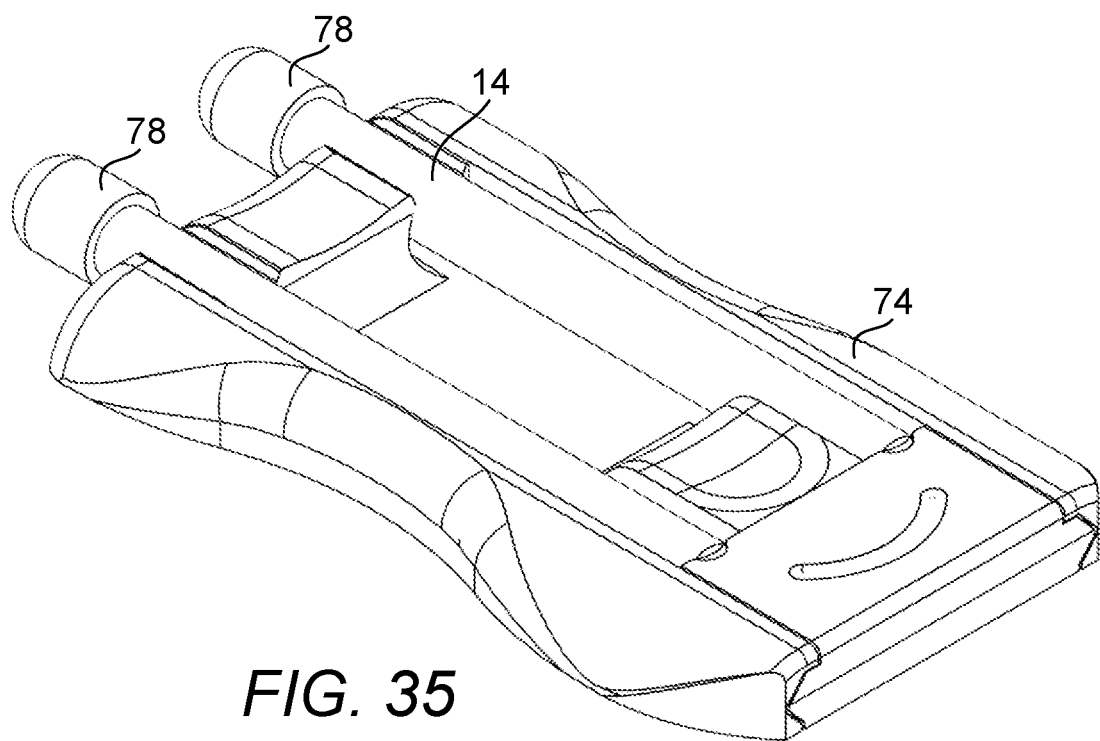
FIG. 35 is a bottom front perspective view of a base member of one embodiment according to a present configurable stand and tie base with a first portion of the base member shown without channels.
Figure 36:
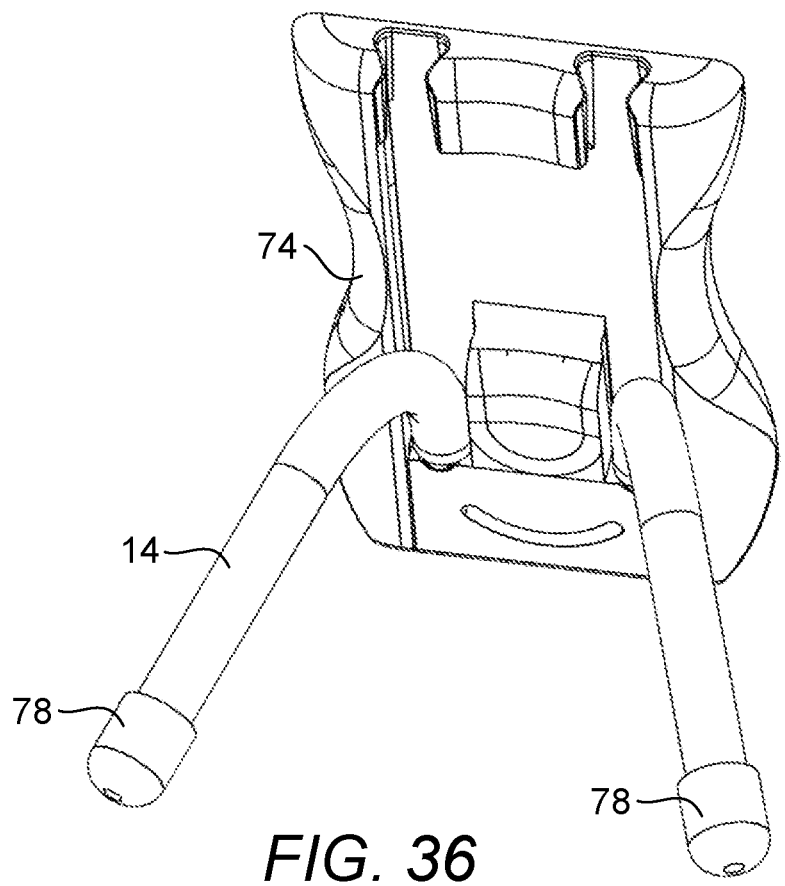
FIG. 36 is a top front perspective view of a base member of one embodiment according to a present configurable stand and tie base with a first portion of the base member shown without channels and the flexible tie shown disposed in an erected posture.

FIG. 35 is a bottom front perspective view of a base member of one embodiment according to a present configurable stand and tie base with a first portion of the base member shown without channels. FIG. 36 is a top front perspective view of a base member of one embodiment according to a present configurable stand and tie base with a first portion of the base member shown without channels and the flexible tie shown disposed in an erected posture. In applications where there are only minor concerns in organizing the flexible tie while it is not in use or where the second portion may be removed more frequently, no channels will be provided, making it easier for the flexible tie to be bent to be out of the way of the normal use of the object it supports or for the second portion to be separated from the first portion while the present configurable stand and tie base is not in use.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A configurable stand and tie base of an object, the configurable stand and tie base comprising:
   (a) a base member comprising a front portion and a rear portion, wherein said front portion comprises a surface having an edge surrounding said surface; and
   (b) a channel disposed on said surface of said front portion of said base member, away from said edge, said channel is configured to receive a flexible tie having a circular cross-sectional profile and secure the flexible tie along the length of a portion of the flexible tie seated in said channel,
   wherein said base member further comprises a first portion upon which said channel is disposed and a second portion comprising a retainer configured for retaining the flexible tie and configured to be removably coupled to said first portion and said retainer comprises a complementary pair of jaws configured to accommodate the flexible tie while being coupled together to secure the flexible tie to said retainer, the flexible tie is disposable at least partially in said channel when said configurable stand and tie base is not in use to increase the compactness of said configurable stand and tie base, a larger portion of the flexible tie is removable from said channel when said configurable stand and tie is in use.

2. The configurable stand and tie base of claim 1, wherein said first portion and said second portion are configured to be removably coupled with a male-female buckle pair.

3. The configurable stand and tie base of claim 1, further comprising an adhesive disposed on said rear portion of said base member, wherein said adhesive is configured for attachment to a surface of the object.

4. The configurable stand and tie base of claim 1, wherein said channel comprises a cross-sectional profile having a body and a neck that is narrower than said body such that when the flexible tie is inserted within said body through said neck, the flexible tie is retainable within said body.

5. The configurable stand and tie base of claim 1, wherein said channel comprises two walls leaning towards one another to form a cross-sectional profile having a body and a neck that is narrower than said body such that when the flexible tie is inserted within said body through said neck, the flexible tie is retainable within said body.

6. The configurable stand and tie base of claim 5, wherein at least one of said two walls further comprises a chamfer disposed on said at least one of said two walls for facilitating seating of the flexible tie in said body through said neck.

7. The configurable stand and tie base of claim 4, wherein a width of said neck of said channel is about 0.25 inch.

8. A configurable stand and tie base of an object, the configurable stand and tie base comprising a base member comprising:
   (a) a first portion; and
   (b) a second portion comprising at least one flexible tie having a circular cross-sectional profile, wherein said first portion is configured to be removably attached to said second portion with a male-female buckle, said first portion comprises at least one channel disposed on a surface of said first portion and said at least one channel is configured to receive said at least one flexible tie and said male-female buckle comprises a male buckle comprising a pair of prongs and a female buckle comprising a hole, said pair of prongs configured to be removably secured within said hole to cause said first portion to be removably attached to said second portion.

9. The configurable stand and tie base of claim 8, further comprising an adhesive disposed on a portion of said base member, wherein said adhesive is configured for attachment to a surface of the object.

10. The configurable stand and tie base of claim 8, wherein said at least one channel comprises a cross-sectional profile having a body and a neck that is narrower than said body such that when said at least one flexible tie is inserted within said body through said neck, said at least one flexible tie is retainable within said body.

\* \* \* \* \*